United States Patent
Murakami

(10) Patent No.: US 8,857,582 B2
(45) Date of Patent: Oct. 14, 2014

(54) HYDRAULIC SHOCK ABSORBER

(75) Inventor: Yosuke Murakami, Fukuroi (JP)

(73) Assignee: Showa Corporation, Shizuoka (JP)

( * ) Notice: Subject to any disclaimer, the term of this patent is extended or adjusted under 35 U.S.C. 154(b) by 199 days.

(21) Appl. No.: 12/814,408

(22) Filed: Jun. 11, 2010

(65) Prior Publication Data

US 2010/0326780 A1 Dec. 30, 2010

(30) Foreign Application Priority Data

Jun. 30, 2009 (JP) .................. 2009-154936
Feb. 25, 2010 (JP) .................. 2009-040906

(51) Int. Cl.
  *F16F 9/34* (2006.01)
  *F16F 9/44* (2006.01)
  *F16F 9/18* (2006.01)

(52) U.S. Cl.
  CPC .............. *F16F 9/187* (2013.01); *F16F 9/446* (2013.01)
  USPC .................. 188/322.13; 188/314; 188/322.21

(58) Field of Classification Search
  USPC .............. 188/314, 31, 319.2, 322.13, 322.21, 188/266, 282, 299.1
  See application file for complete search history.

(56) References Cited

U.S. PATENT DOCUMENTS

| 4,561,524 A | 12/1985 | Mizumukai et al. |
| 5,649,611 A * | 7/1997 | Nakadate .................. 188/322.13 |
| 6,119,829 A * | 9/2000 | Nakadate .................. 188/266.6 |
| 6,305,512 B1* | 10/2001 | Heinz et al. ................ 188/299.1 |
| 2004/0134730 A1* | 7/2004 | Forster ........................... 188/314 |
| 2006/0054435 A1* | 3/2006 | Yamaguchi ................. 188/314 |
| 2008/0257668 A1* | 10/2008 | Yamaguchi et al. .......... 188/285 |

FOREIGN PATENT DOCUMENTS

| JP | U62-24846 | 6/1987 |
| JP | 63-199189 | 8/1988 |
| JP | 04-046816 | 2/1992 |
| JP | 2005-054942 | 3/2005 |
| JP | P2007-177877 | 7/2007 |
| JP | 2009-085263 A | 4/2009 |
| JP | P2009-133411 | 6/2009 |

* cited by examiner

*Primary Examiner* — Bradley T King
*Assistant Examiner* — Mahbubur Rashid
(74) *Attorney, Agent, or Firm* — Babcock IP, PLLC

(57) ABSTRACT

In a hydraulic shock absorber, a damping force generating device is provided between a piston side oil chamber and a rod side oil chamber of a cylinder, and in a compression stroke, a compression side flow path for circulating oil in the piston side oil chamber of the cylinder through an outside flow path of the cylinder toward the rod side oil chamber is provided in the damping force generating device, while in an extension stroke, an extension side flow path for circulating the oil in the rod side oil chamber of the cylinder through the outside flow path of the cylinder toward the piston side oil chamber is provided in the damping force generating device.

3 Claims, 23 Drawing Sheets

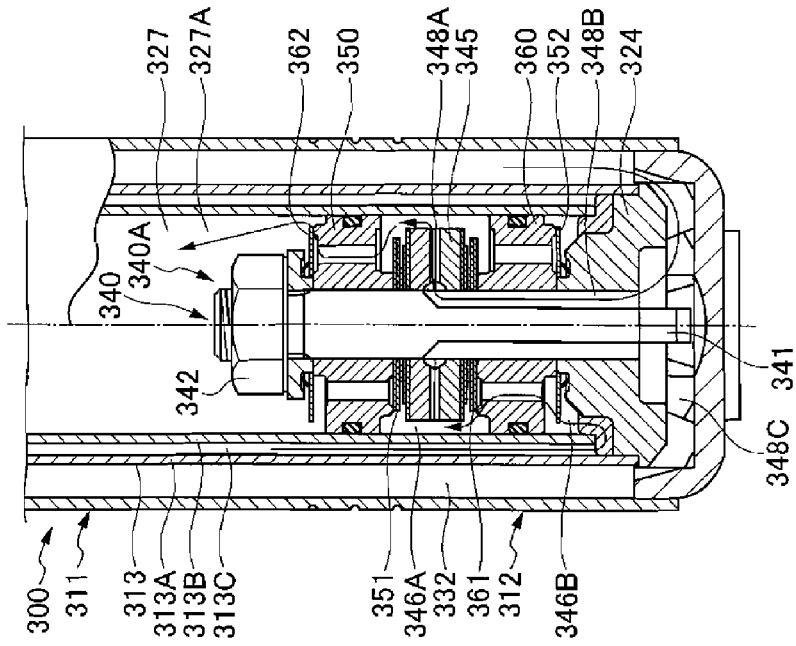
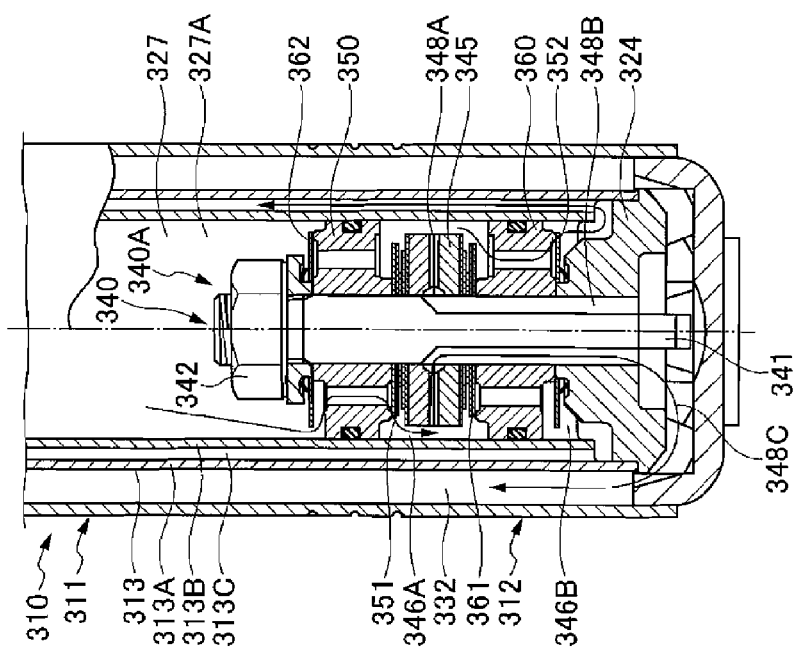

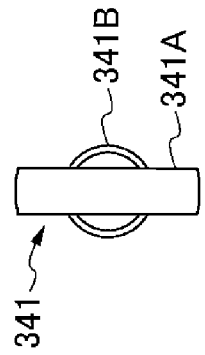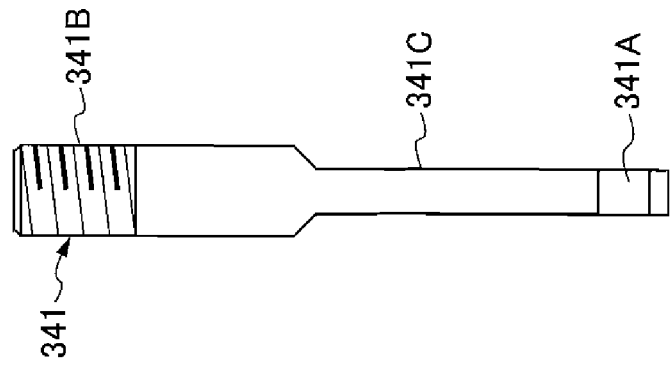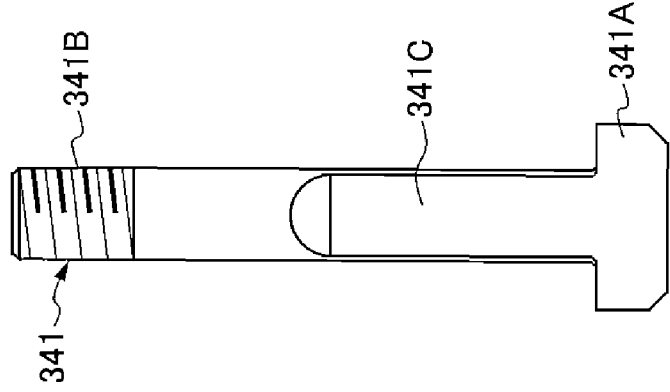

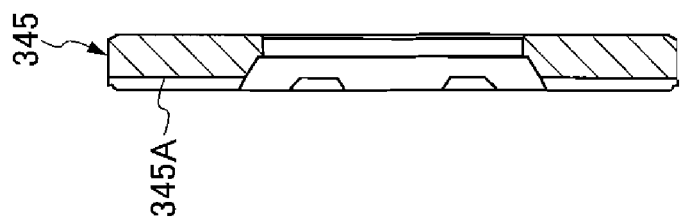
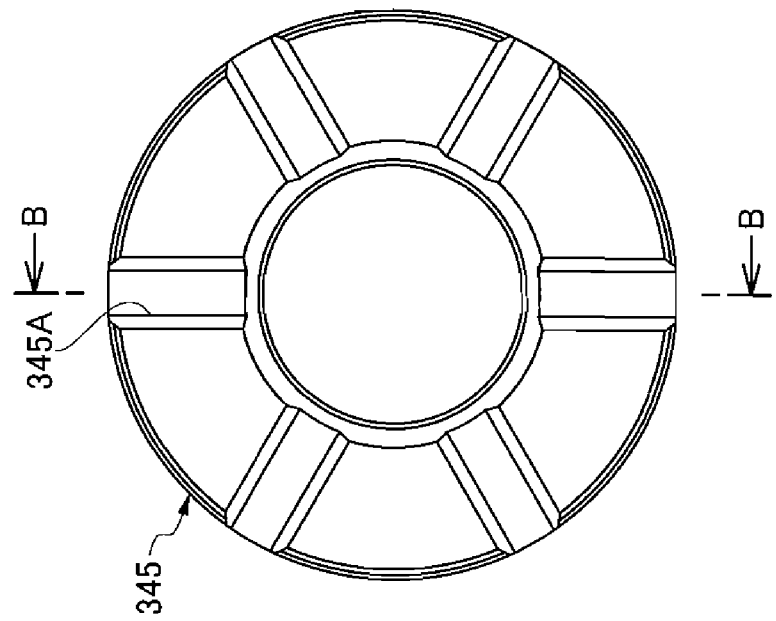

HYDRAULIC SHOCK ABSORBER

BACKGROUND OF THE INVENTION

1. Field of the Invention

The present invention relates to a hydraulic shock absorber.

2. Description of the Related Art

A conventional hydraulic shock absorber described, for example, in Japanese Unexamined Patent Publication No. 2007-177877 (patent document 1) is structured, as shown in FIG. 9, such that a piston rod 2 attached to one of a vehicle body side and an axle side is inserted into an oil chamber of a cylinder 1 attached to the other of the vehicle body side and the axle side, the oil chamber of the cylinder 1 is comparted into a piston side oil chamber 4A and a rod side oil chamber 4B by the piston 3 provided in a leading end portion of the piston rod 2, and a damping force generating device 5 is provided on the piston 3. Further, an oil reservoir chamber 6 compensating a volumetric capacity (including a volumetric capacity corresponding to a temperature extension of the oil) of the piston rod 2 moving forward and backward with respect to the oil chambers 4A and 4B of the cylinder 1 communicates with the piston side oil chamber 4A of the cylinder 1, and a valve housing 7 provided with a damping force generating device 8 is interposed between the piston side oil chamber 4A of the cylinder 1 and the oil reservoir chamber 6. The oil reservoir chamber 6 is pressurized by an air chamber 6A (a bladder, a free piston or the like may be interposed between the oil reservoir chamber 6 and the air chamber 6A).

In this case, the damping force generating device 5 includes a compression side damping valve 5A opening and closing a compression side flow path 3A provided in the piston 3, and an extension side damping valve 5B opening and closing an extension side flow path 3B provided in the piston 3. The damping force generating device 8 includes a compression side damping valve 8A opening and closing a compression side flow path 7A provided in the valve housing 7, and an extension side damping valve 8B opening and closing an extension side flow path 7B provided in the valve housing 7.

In a compression stroke, the pressure of the oil in the piston side oil chamber 4A rises and the oil flows out through the compression side damping valve 8A of the compression side flow path 7A to the oil reservoir chamber 6 and through the compression side damping valve 5A of the compression side flow path 3A to the rod side oil chamber 4B, thereby generating a compression side damping force based on a flow path resistance of the compression side damping valve 8A and the compression side damping valve 5A. As a result, an amount of oil corresponding to the volumetric capacity of the forward movement of the piston rod 2 is discharged to the oil reservoir chamber 6 through the compression side damping valve 8A. In an extension stroke, the pressure of the oil in the rod side oil chamber 4B rises and the oil flows out through the extension side damping valve 5B of the extension side flow path 3B to the piston side oil chamber 4A, thereby generating an extension side damping force based on a flow path resistance of the extension side damping valve 5B, and an amount of oil corresponding to the volumetric capacity of the backward movement of the piston rod 2 is replenished to the piston side oil chamber 4A from the oil reservoir chamber 6 through the extension side damping valve 8B of the extension side flow path 7B.

In the conventional hydraulic shock absorber, since the oil with increased pressure in the piston side oil chamber 4A (the COMP chamber) flows separately into two flow paths 7A and 3A respectively directed to the oil reservoir chamber 6 and the rod side oil chamber 4B (the TEN chamber) in the compression stroke as shown in FIG. 9, the pressure of the rod side oil chamber 4B is changed from a positive pressure to a negative pressure based on a balance of the flow path resistance between the compression side damping valves 8A and 5A of the flow paths 7A and 3A. In other words, the pressure of the rod side oil chamber 4B is changed from the positive pressure to the negative pressure based on the balance of the flow path resistance of the compression side damping valve 8A, the air pressure of the air chamber 6A, and the flow path resistance of the compression side damping valve 5A, and if the flow path resistance of the compression side damping valve 5A is too large, a cavitation is generated in the rod side oil chamber 4B and a pause in a damping force occurs when reversing to the extension stroke.

In the extension stroke, the oil with increased pressure in the rod side oil chamber 4B only flows out through one flow path 3B to the piston side oil chamber 4A, and the pressure in the piston side oil chamber 4A does not generate any fluctuation while depending only upon the air pressure of the air chamber 6A.

SUMMARY OF THE INVENTION

An object of the present invention is to provide a hydraulic shock absorber in which a pressure in a rod side oil chamber is prevented from being changed depending on the setting of a flow path resistance of a compression side damping valve in a compression stroke in which oil in a piston side oil chamber flows out to the rod side oil chamber and an oil reservoir chamber, thereby avoiding a pause in a damping force when reversing to an extension stroke.

Further, an object of the present invention is to control a pressure of a rod side oil chamber depending on a piston speed in a compression stroke, in a hydraulic shock absorber.

Further, an object of the present invention is to control a pressure of a piston side oil chamber depending on a piston speed in an extension stroke, in a hydraulic shock absorber.

In a first aspect of the invention, a hydraulic shock absorber is provided, comprising: a piston rod attached to one of a vehicle body side and an axle side, the piston rod being inserted into an oil chamber of a cylinder which is attached to the other of the vehicle body side and the axle side; the oil chamber of the cylinder being comparted into a piston side oil chamber and a rod side oil chamber by a piston provided in a leading end portion of the piston rod; and an oil reservoir chamber for compensating a volumetric capacity of the piston rod moving forward and backward with respect to the oil chamber of the cylinder, the oil reservoir chamber being in communication with the oil chamber of the cylinder. A damping force generating device is provided between the piston side oil chamber and the rod side oil chamber of the cylinder, wherein in a compression stroke, a compression side flow path for circulating oil in the piston side oil chamber of the cylinder through an outside flow path of the cylinder toward the rod side oil chamber is provided in the damping force generating device, a compression side damping valve is provided in an upstream side of the compression side flow path, a compression side check valve is provided in a downstream side thereof, and an intermediate portion of the compression side damping valve and the compression side check valve in the compression side flow path communicates with the oil reservoir chamber, and wherein in an extension stroke, an extension side flow path for circulating oil in the rod side oil chamber of the cylinder through the outside flow path of the cylinder toward the piston side oil chamber is provided in the damping force generating device, an extension side damping valve is provided in an upstream side of the extension side flow path, an extension side check valve is provided in a downstream side thereof, and an intermediate portion of the extension side damping valve and the extension side check valve in the extension side flow path communicates with the oil reservoir chamber.

In accordance with the present invention, the following effects can be obtained.

(a) In the hydraulic shock absorber, the damping force generating device is provided between the piston side oil chamber and the rod side oil chamber of the cylinder, and in the compression stroke, the compression side flow path for circulating the oil in the piston side oil chamber of the cylinder through the outside flow path of the cylinder toward the rod side oil chamber is provided in the damping force generating device, the compression side damping valve is provided in the upstream side of the compression side flow path, the compression side check valve is provided in the downstream side thereof, the intermediate portion of the compression side damping valve and the compression side check valve in the compression side flow path communicates with the oil reservoir chamber, while in the extension stroke, the extension side flow path for circulating the oil in the rod side oil chamber of the cylinder through the outside flow path of the cylinder toward the piston side oil chamber is provided in the damping force generating device, the extension side damping valve is provided in the upstream side of the extension side flow path, the extension side check valve is provided in the downstream side thereof, and the intermediate portion of the extension side damping valve and the extension side check valve in the extension side flow path communicates with the oil reservoir chamber.

In the compression stroke, the oil with increased pressure in the piston side oil chamber generates the compression side damping force through the compression side damping valve in the upstream side of the compression side flow path of the damping force generating device. The flow of the one portion of oil flowing out of the compression side damping valve flows into the rod side oil chamber through the outside flow path of the cylinder from the compression side check valve. Further, the flow of the amount of oil corresponding to the forward moving volumetric capacity of the piston rod, which is the flow of the other portion of oil flowing out of the compression side damping valve, flows into the oil reservoir chamber. At this time, the pressure of the rod side oil chamber depends substantially only upon the pressure of the air chamber pressurizing the oil reservoir chamber (since the flow path resistance between the compression side check valve in the downstream side of the compression side damping valve and the outside flow path 11C of the cylinder is small), and does not change depending on the setting of the flow path resistance of the compression side damping valve. Accordingly, it is possible to avoid the pause in the damping force when reversing to the extension stroke.

In the extension stroke, the oil with increased pressure in the rod side oil chamber generates the extension side damping force through the outside flow path of the cylinder and the extension side damping valve in the upstream side of the extension side flow path of the damping force generating device. The oil flowing out of the extension side damping valve flows together with the amount of oil corresponding to the backward moving volumetric capacity of the piston rod replenished from the oil reservoir chamber, and thereafter flows into the piston side oil chamber through the extension side check valve.

In this case, it is possible to make the pressure of the rod side oil chamber a high positive pressure in the compression stroke so as to improve a damping response when reversing to the extension, by setting the pressure of the air chamber pressurizing the oil reservoir chamber to a high pressure.

In a second aspect of the invention, a hydraulic shock absorber according to the first aspect, wherein the damping force generating device includes a compression side damping force generating means added to the compression side check valve provided in the downstream side of the compression side flow path.

In accordance with the present invention, the following effects can be obtained.

(b) The damping force generating device in the above (a) is structured such that the compression side disc valve is provided in the compression side flow path. The compression side disc valve includes a compression side damping force generating means added to the compression side check valve. At this time, in the compression stroke, while one flow of the oil flowing out through the compression side damping valve in the upstream side passes through the compression side disc valve and the outside flow path of the cylinder so as to flow into the rod side oil chamber, the compression side disc valve carries out the compression side damping force generating function as well as the check function. The compression side disc valve generates the damping force $\Delta F$ depending on the piston speed, and the pressure Pr of the rod side oil chamber becomes a value obtained by subtracting the value $\Delta F$ from the pressure Pa of the air chamber pressurizing the oil reservoir chamber, namely, a value controlled depending on the piston speed.

The pressure Pr of the rod side oil chamber being controlled in the compression stroke depending on the piston speed as described above means that it is possible to control a rise characteristic of the damping force when reversing to the extension stroke depending on the piston speed. When the piston speed is high, the value $\Delta F$ becomes large by the throttle of the compression side disc valve, and the value Pr becomes small. Accordingly, the rise of the damping force when reversing to the extension stroke becomes gentle and the ride quality is improved. When the piston speed is low, the value $\Delta F$ generated by the throttling the compression side disc valve becomes small, and the value Pr becomes large. Accordingly, the rise of the damping force when reversing to the extension stroke becomes sharp, and it is possible to suppress the wobbliness of the vehicle body so as to improve the driving stability.

At this time, while the total amount of the compression side damping force becomes the total of the damping force of the compression side damping valve and the damping force of the compression side disc valve, in the normal setting, the damping force of the compression side damping valve is made larger. The total amount of the compression side damping force largely depends on the damping force of the compression side damping valve.

In a third aspect of the invention, a hydraulic shock absorber according to the first or second aspect, wherein the damping force generating device includes a extension side damping force generating means added to the extension side check valve provided in the downstream side of the extension side flow path.

In accordance with the present invention, the following effects can be obtained.

(c) The damping force generating device in the above (a) is structured such that the extension side disc valve is provided in the extension side flow path. The extension side disc valve includes a extension side damping force generating means added to the extension side check valve. At this time, in the extension stroke, while one flow of the oil flowing out through the extension side damping valve in the upstream side flows into the piston side oil chamber through the extension side disc valve and the outside flow path of the cylinder, the extension side disc valve carries out the extension side damping force generating function as well as the check function. The extension side disc valve generates the damping force $\Delta F$ depending on the piston speed, and the pressure Pp of the piston side oil chamber becomes the value obtained by subtracting the value $\Delta F$ from the pressure Pa of the air chamber pressurizing the oil reservoir chamber, namely, the value controlled depending on the piston speed.

The pressure Pp of the piston side oil chamber being controlled depending on the piston speed in the extension stroke as described above means that it is possible to control the rise characteristic of the damping force when reversing to the compression stroke depending on the piston speed. When the piston speed is high, the value $\Delta F$ becomes large by the throttle of the extension side disc valve, and the value Pp becomes small. Accordingly, the rise of the damping force when reversing to the compression stroke becomes gentle so as to improve the ride quality. When the piston speed is low, the value $\Delta F$ generated by the throttle of the extension side disc valve becomes small, and the value Pp becomes large. Accordingly, the rise of the damping force when reversing to the compression stroke becomes sharp so as to suppress the wobbliness of the vehicle body and improve the driving stability.

At this time, while the total amount of the extension side damping force becomes the total of the damping force of the extension side damping valve, and the damping force of the extension side disc valve, the damping force of the extension side damping valve is made larger in the normal setting. The total amount of the extension side damping force largely depends on the damping force of the extension side damping valve.

In a fourth aspect of the invention, a hydraulic shock absorber according to anyone of the first to third aspects, wherein the damping force generating device has a valve piece which is fixed to the cylinder, wherein a center plate is provided in the center along an axial direction of an outer periphery of the valve piece, and wherein the compression side damping valve and the extension side check valve are provided on one side in the axial direction with respect to the center plate in the outer periphery of the valve piece, the extension side damping valve and the compression side check valve are provided on the other side, and a set of the compression side damping valve and the extension side check valve and a set of the extension side damping valve and the compression side check valve are arranged line-symmetric with respect to the center plate.

In accordance with the present invention, the following effects can be obtained.

(d) The damping force generating device in the above (a) to (c) has the valve piece which is fixed to the cylinder, provided with the center plate in the center along the axial direction of the outer periphery of the valve piece, is provided with the compression side damping valve and the extension side check valve on the one side in the axial direction with respect to the center plate in the outer periphery of the valve piece, and is provided with the extension side damping valve and the compression side check valve on the other side, where the set of the compression side damping valve and the extension side check valve and the set of the extension side damping valve and the compression side check valve are arranged line-symmetric with respect to the center plate. Accordingly, it is possible to achieve both of the flow path of the oil in the above (a) which flows from the piston side oil chamber through the damping force generating device into the rod side oil chamber and the oil reservoir chamber in the compression stroke and the flow path of the oil in the above (a) which flows from the rod side oil chamber and the oil reservoir chamber through the damping force generating device into the piston side oil chamber in the extension stroke that are short in flow path length and small in flow path resistance, and it is possible to make the flows of the oil smooth.

In a fifth aspect of the invention, the hydraulic shock absorber is provided according to the fourth aspect, wherein the damping force generating device fixes a valve piece onto the center axis of the cylinder at one end side within the piston side oil chamber of the cylinder, and wherein the compression side flow path and the extension side flow path are provided around the center plate, and the compression side flow path and the extension side flow path are communicated with the oil reservoir chamber via a communication path provided in the center plate, and a communication path provided in the valve piece.

In accordance with the present invention, the following effects can be obtained.

(e) The damping force generating device in the above (d) fixes the valve piece onto the center axis of the cylinder at one end side within the piston side oil chamber of the cylinder, is provided with the compression side flow path and the extension side flow path around the center plate, and communicates the compression side flow path and the extension side flow path 46 with the oil reservoir chamber via the groove holes in the center plate and the communication path in the valve piece. Accordingly, it is possible to make the path communicating the intermediate portion between the compression side flow path and the extension side flow path of the damping force generating device with the oil reservoir chamber compact, and make the flow of the oil in the path smooth.

In a sixth aspect of the invention, the hydraulic shock absorber is provided according to the fourth or fifth aspect, wherein the damping force generating device is provided in the valve piece with a bypass flow path communicating the piston side oil chamber of the cylinder with the rod side oil chamber and the oil reservoir chamber, bypassing the compression side damping valve and the extension side damping valve, and is provided in the bypass flow path with a damping force adjusting valve that is externally operated.

In accordance with the present invention, the following effects can be obtained.

(f) The damping force generating device in the above (d) or the above (e) is provided with the bypass flow path communicating the piston side oil chamber of the cylinder with the rod side oil chamber and the oil reservoir chamber, bypassing the compression side damping valve and the extension side damping valve, in the hollow portion provided on the center axis of the valve piece, and is provided with the externally operated damping force regulating valve in the bypass flow path. Accordingly, it is possible to regulate a magnitude of the compression side damping force by using the damping force generating device.

In a seventh aspect of the invention, the hydraulic shock absorber is provided according to any one of the first to sixth aspect, wherein an outside flow path communicating the piston side oil chamber with the rod side oil chamber is provided around the oil chamber of the cylinder, and wherein an oil reservoir chamber is provided around the oil chamber of the cylinder and the outside flow path.

In accordance with the present invention, the following effects can be obtained.

(g) In the hydraulic shock absorber, the outside flow path communicating the piston side oil chamber with the rod side oil chamber is provided in the periphery of the oil chamber of the cylinder, and the oil reservoir chamber is provided in the periphery of the oil chamber of the cylinder and the outside flow path. Accordingly, the oil chamber is provided in the center portion of the cylinder, the outside flow path is provided outside of the oil chamber, and the oil reservoir chamber is provided further outside of the outside flow path. Therefore, in the hydraulic shock absorber, the oil chamber of the cylinder, the outside flow path and the oil reservoir chamber can be provided in conjunction inside the damper tube having the short total length, without enlarging the damper tube, and it is possible to improve a flexibility of a layout in the vehicle in which the hydraulic shock absorber is mounted.

In an eighth aspect of the invention, a hydraulic shock absorber according to the first aspect, wherein the cylinder is inserted and fitted into the damper tube, and wherein the cylinder is constructed by an outer tube and an inner tube, forms the oil chamber inside the inner tube, forms the outside flow path between the outer tube and the inner tube, and forms the oil reservoir chamber between the damper tube and the outer tube.

In accordance with the present invention, the following effects can be obtained.

(h) The cylinder is inserted and fitted into the damper tube, the cylinder is constructed by the outer tube and the inner tube, the oil chamber is formed inside the inner tube, the outside flow path is formed between the outer tube and the inner tube, and the oil reservoir is formed between the damper tube and the outer tube. It is thus possible to achieve the above (g) in a compact manner based on a triple-tube structure constructed by the damper tube, and the outer tube and the inner tube of the cylinder.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 21A and 21B show a flow of an oil in a damping force generating device, in which FIG. 21A is a cross sectional view showing a compression stroke, and FIG. 21B is a cross sectional view showing an extension stroke;

FIGS. 22A to 22C show a valve piece, in which FIG. 22A is a front elevational view, FIG. 22B is a side elevational view, and FIG. 22C is a plan view; and FIGS. 23A and 23B show a center plate, in which FIG. 23A is a plan view, and FIG. 23B is a cross sectional view taken along a line B-B of FIG. 23A.

DESCRIPTION OF THE PREFERRED EMBODIMENTS

Embodiment 1

FIGS. 1 to 4

Figure 1:
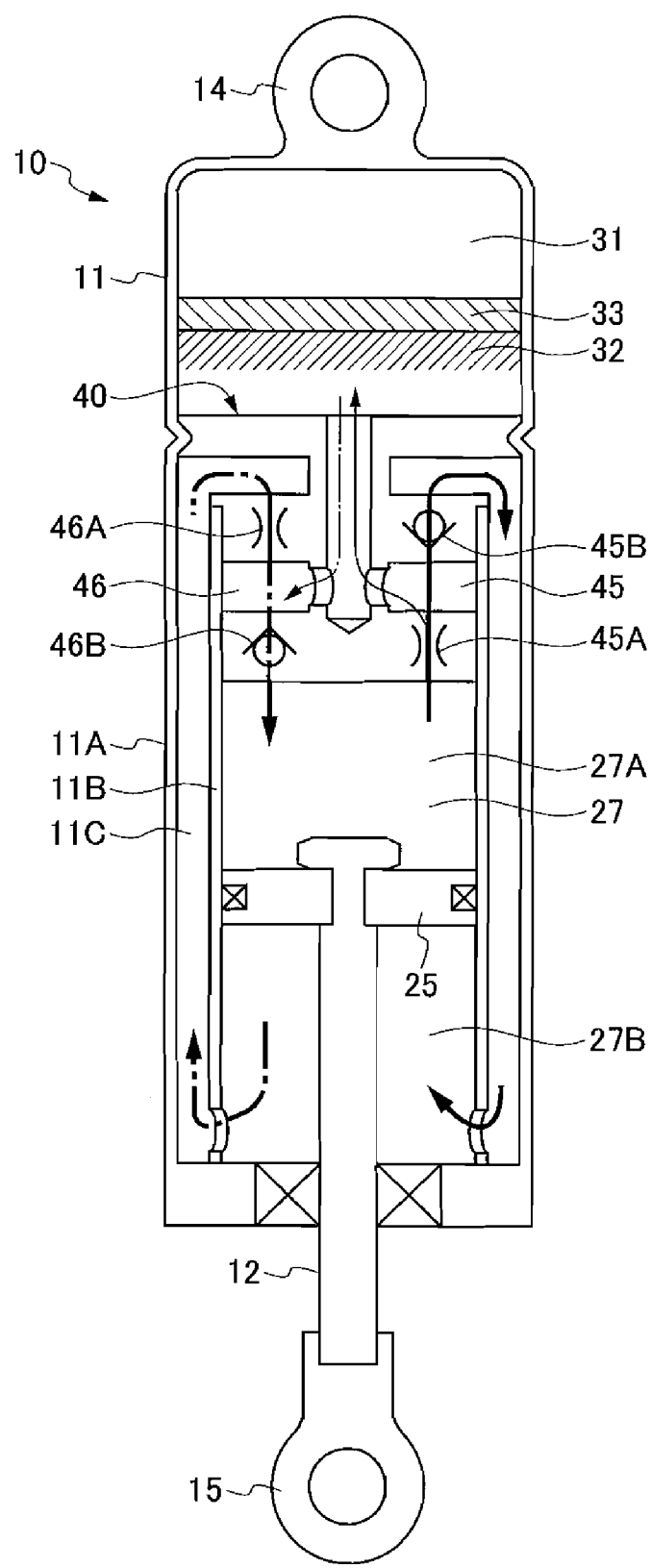
FIG. 1 is a schematic cross sectional view showing a basic structure of a hydraulic shock absorber according to an Embodiment 1.
Figure 2:
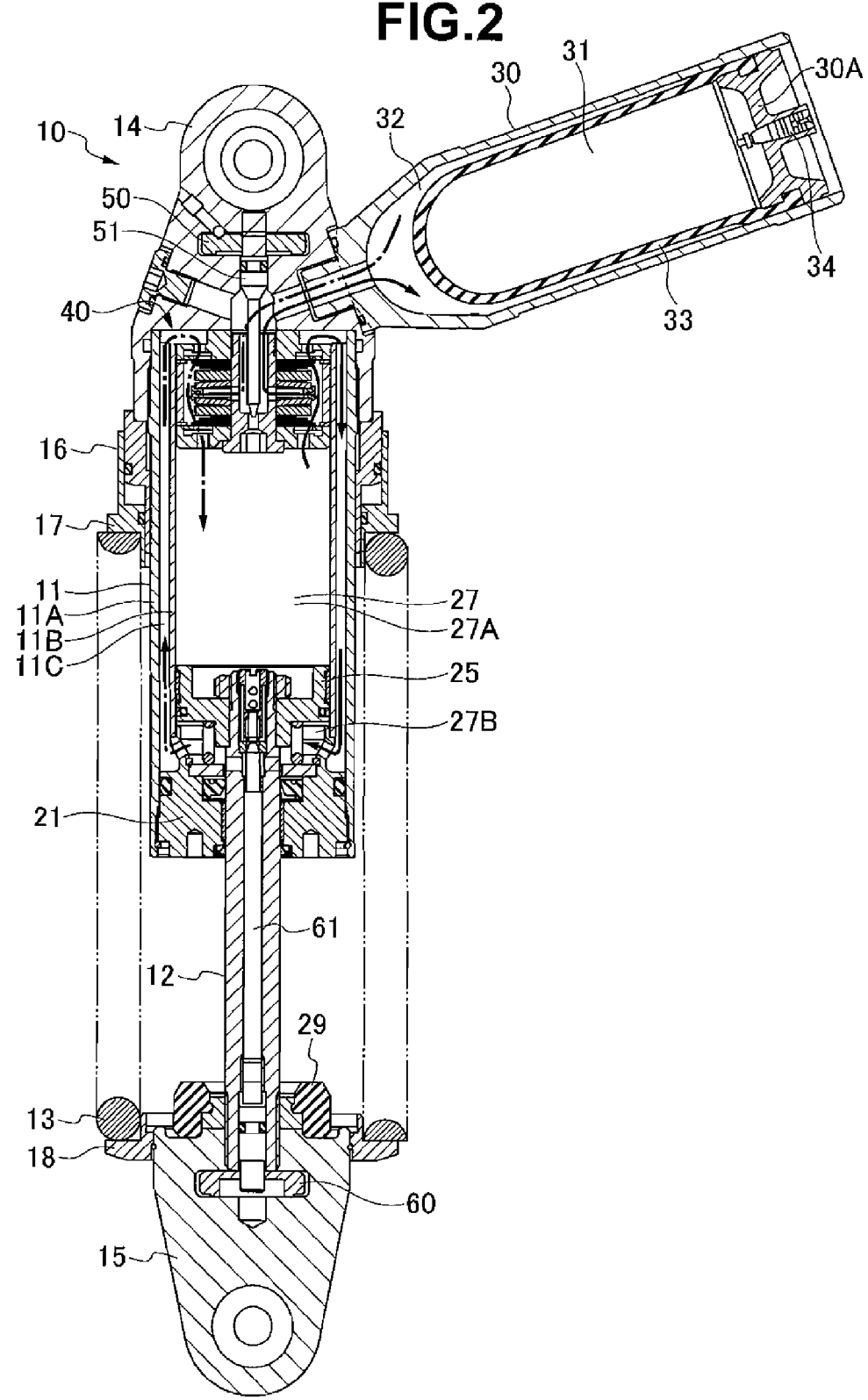
FIG. 2 is a cross sectional view showing a hydraulic shock absorber according to the Embodiment 1.

A hydraulic shock absorber 10 is structured, as shown in FIGS. 1 and 2, such that a hollow piston rod 12 attached to an axle side is slidably inserted into an oil chamber 27 of a damper cylinder 11 attached to a vehicle body side, and a suspension spring 13 is interposed on an outer side portion of the cylinder 11 and the piston rod 12.

The cylinder 11 is provided with a vehicle body side attaching member 14, and the piston rod 12 is provided with an axle side attaching member 15. A spring load regulating hydraulic jack 16 is mounted on an outer peripheral portion of the cylinder 11, a spring receiver 17 is provided on the hydraulic jack 16, and a spring receiver 18 is provided on an outer side portion of the axle side attaching member 15. The suspension spring 13 is interposed between the spring receiver 17 and the spring receiver 18, and a set length (a spring load) of the suspension spring 13 is regulated by an upward and downward moving operation of the hydraulic jack 16. A spring force of the suspension spring 13 absorbs an impact force that a vehicle receives from a road surface.

Figure 3:
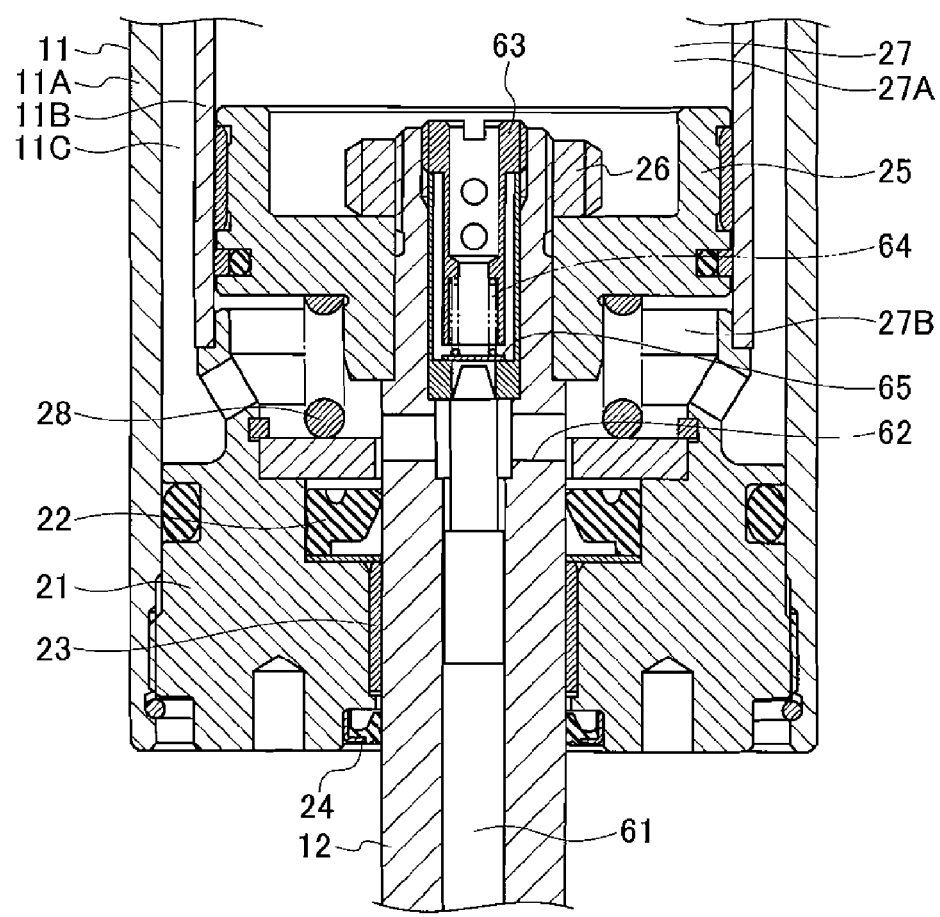
FIG. 3 is a cross sectional close-up view showing a piston area of FIG. 2.
Figure 4:
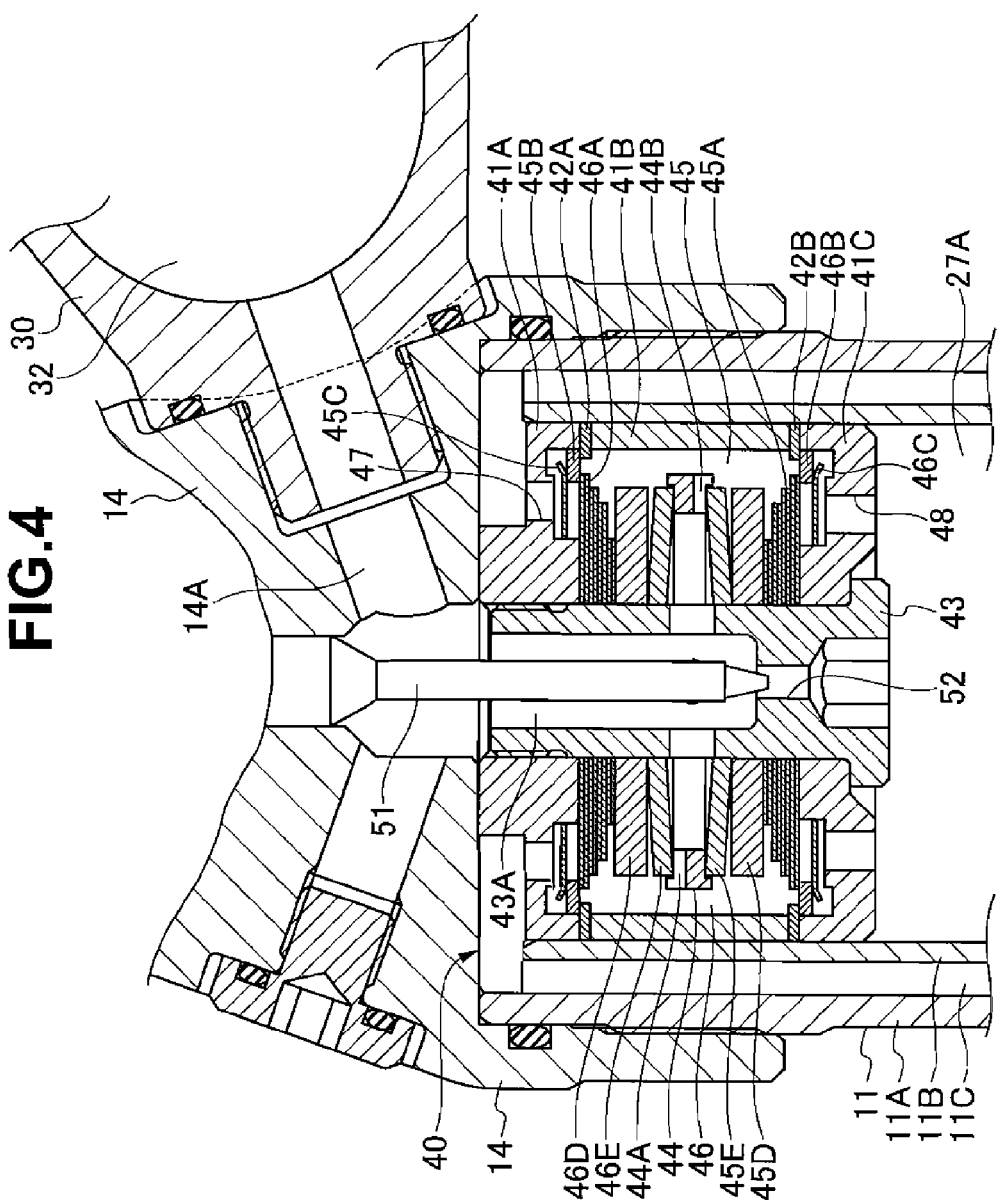
FIG. 4 is a cross sectional close-up view showing a damping force generating device area of FIG. 2.

The cylinder 11 has a rod guide 21 through which the piston rod 12 passes, in its opening portion, as shown in FIG. 3. The rod guide 21 is inserted and attached in a liquid tight manner to the cylinder 11 to allow the piston rod 12 to slide freely in a liquid tight manner along an inner diameter portion having an oil seal 22, a bush 23 and a dust seal 24.

The hydraulic shock absorber 10 is structured such that the cylinder 11 is formed as a double tube constructed by an outer tube 11A and an inner tube 11B, an upper end outer periphery of the outer tube 11A is screwed to the vehicle body side attaching member 14, a large outer diameter portion of the rod guide 21 is screwed to a lower end inner periphery of the outer tube 11A, a lower end inner periphery of the inner tube 11B is fitted to a small outer diameter portion of the rod guide 21.

Further, a piston 25 inserted and attached to a leading end portion of the piston rod 12 is fixed by a nut 26, and an oil chamber 27 of the cylinder 11 is comparted into a piston side oil chamber 27A and a rod side oil chamber 27B by the piston 25 slidably inserted into an inner periphery of the inner tube 11B. Reference numeral 28 denotes a rebound spring, and reference numeral 29 (FIG. 2) denotes a bump rubber.

As best shown in FIG. 2, the hydraulic shock absorber 10 is structured such that a sub tank 30 is fixed to the vehicle body side attaching member 14, and an air chamber 31 and an oil reservoir chamber 32 which are provided within the sub tank 30 sealed by a cap 30A are separated by a bladder 33. The oil reservoir chamber 32 pressurized by a pressure of the air chamber 31 which is set to a high pressure via an air valve 34 provided in the cap 30A communicates with the oil chamber 27 of the cylinder 11, and a volumetric capacity (including a volumetric capacity corresponding to a temperature extension of the oil) of the piston rod 12 which moves forward and backward with respect to the oil chamber 27 of the cylinder 11 is compensated by the oil reservoir chamber 32.

The hydraulic shock absorber 10 is provided with a damping force generating device 40 between the piston side oil chamber 27A and the rod side oil chamber 27B of the cylinder 11.

The damping force generating device 40 is installed close to the vehicle body side attaching member 14 inside the cylinder 11, houses a step shaped outer peripheral portion of an upper valve holder 41A coaxially arranged in the cylinder 11 in an upper end inner periphery of the outer tube 11A and the inner tube 11B, and pinches and fixes an outer edge portion of the upper valve holder 41A between an upper end surface of the inner tube 11B and an inner surface of the vehicle body side attaching member 14. The damping force generating device 40 pinches and holds a compression side seat 42A, an intermediate valve holder 41B, an extension side seat 42B and a lower valve holder 41C which are loaded in this order from a side of the upper valve holder 41A on an inner periphery of the inner tube 11B, on a center axis of the upper valve holder 41A by a bolt-like valve piece 43 which is engaged with a center hole of the lower valve holder 41C and is screwed to a center thread portion of the upper valve holder 41A.

The damping force generating device 40 fixes the valve piece 43 onto the center axis of the cylinder 11 at one end side within the piston side oil chamber 27A of the cylinder 11, in the manner described above. The damping force generating device 40 is provided with a center plate 44 having an annular interval in an outer periphery of the valve piece 43 in the center along an axial direction of an outer periphery of the valve piece 43, and is provided with a compression side flow path 45 and an extension side flow path 46 around the center plate 44, which is surrounded by the intermediate valve holder 41B (the compression side flow path 45 and the extension side flow path 46 are identical and construct a common flow path with each other in the present embodiment). The center plate 44 is provided with groove holes 44A and 44B penetrating in a diametrical direction respectively at a plurality of positions in a peripheral direction on one end surface side and a plurality of positions in a peripheral direction on the other end surface side.

The damping force generating device 40 is provided with a check valve spring 46C, an extension side check valve 46B, a compression side damping valve 45A, a washer 45D, and an urging member (a disc spring) 45E in this order from a side farther from the center plate 44 on one side in an axial direction with respect to the center plate 44 in the outer periphery of the valve piece 43, and is provided with a check valve spring 45C, a compression side check valve 45B, an extension side damping valve 46A, a washer 46D, and an urging member (a disc spring) 46E in this order from a side farther from the center plate 44 on the other side. Further, the set of the check valve spring 46C, the extension side check valve 46B, the compression side damping valve 45A, the washer 45D and the urging member 46E is arranged to be line-symmetric with the set of the check valve spring 45C, the compression side check valve 45B, the extension side damping valve 46A, the washer 46D, and the urging member 46E with respect to the center plate 44. The compression side check valve 45B has an annular shape, and is pressed to the side of the compression side seat 42A by the check valve spring 45C which is backed up by the upper valve holder 41A. An outer peripheral portion of the compression side check valve 45B seats on the compression side seat 42A, and an outer edge portion of the extension side damping valve 46A seats on an inner peripheral portion of the compression side check valve 45B. The extension side check valve 46B has an annular shape, and is pressed to the side of the extension side seat 42B by the check valve spring 46C which is backed up by the lower valve holder 41C. An outer peripheral portion of the extension side check valve 46B seats on the extension side seat 42B, and an outer edge portion of the compression side damping valve 45A seats on an inner peripheral portion of the extension side check valve 46B.

The damping force generating device 40 communicates the piston side oil chamber 27A and the rod side oil chamber 27B in the cylinder 11 via an extension and compression common flow paths 47 and 48 in the upper valve holder 41A and the lower valve holder 41C, the compression side flow path 45 and the extension side flow path 46 around the center plate 44, an outside flow path 11C provided in an annular gap between the outer tube 11A and the inner tube 11B of the cylinder 11, and a hole path provided in the lower side of the inner tube 11B (the piston 25 does not have any flow path communicating the piston side oil chamber 27A with the rod side oil chamber 27B).

The damping force generating device 40 communicates the compression side flow path 45 and the extension side flow path 46 around the center plate 44 with the oil reservoir chamber 32 of the sub tank 30 via the groove holes 44A and 44B in the center plate 44, a communication path 43A in a diametrical direction of the valve piece 43 and an axial direction on the center axis, a communication path 14A in the vehicle body side attaching member 14 and the like.

Accordingly, in the hydraulic shock absorber 10 during the compression stroke, the compression side flow path 45 for circulating the oil in the piston side oil chamber 27A of the cylinder 11 through the outside flow path 11C of the cylinder 11 toward the rod side oil chamber 27B is provided in the damping force generating device 40, the compression side damping valve 45A is provided in an upstream side of the compression side flow path 45, the compression side check valve 45B is provided in a downstream side thereof, and an intermediate portion of the compression side damping valve 45A and the compression side check valve 45B in the compression side flow path 45 communicates with the oil reservoir chamber 32 via the communication path 43A and the like.

On the other hand during the extension stroke, the extension side flow path 46 for circulating the oil in the rod side oil chamber 27B of the cylinder 11 through the outside flow path 11C of the cylinder 11 toward the piston side oil chamber 27A is provided in the damping force generating device 40, the extension side damping valve 46A is provided in an upstream side of the extension side flow path 46, the extension side check valve 46B is provided in a downstream side thereof, and an intermediate portion of the extension side damping valve 46A and the extension side check valve 46B in the extension side flow path 46 communicates with the oil reservoir chamber 32 via the communication path 43A and the like.

The damping force generating device 40 may be provided with a bypass flow path 52 which communicates the piston side oil chamber 27A of the cylinder 11 with the rod side oil chamber 27B and the oil reservoir chamber 32, bypassing the compression side damping valve 45A and the extension side damping valve 46A, in a hollow portion provided on the center axis including the communication path 43A mentioned above of the valve piece 43 as shown in FIG. 4, if necessary. The compression side damping force can be regulated by regulating an opening area of the bypass flow path 52 by means of a compression side damping force regulating valve 51 which is externally operated by an adjuster 50 provided in the vehicle body side attaching member 14.

Further, the hydraulic shock absorber 10 may be provided with a damping force regulating flow path 62, which communicates the rod side oil chamber 27B of the cylinder 11 with the piston side oil chamber 27A, in the hollow portion of the piston rod 12 as shown in FIG. 3, if necessary. The extension side damping force can be regulated by regulating an opening area of the flow path 62 by means of an extension side damping force regulating valve 61 which is externally operated by an adjuster 60 provided in the axle side attaching member 15. A perforated tube 63 is screwed to the hollow portion of the piston rod 12 from the side of the piston side oil chamber 27A, and a check valve 65 pressurized by a spring 64 supported on the perforated tube 63 is provided in an opening of the flow path 62 in a manner that the check valve 65 can seat from the side of the piston side oil chamber 27A, thereby inhibiting the oil in the piston side oil chamber 27A with the pressure increased in the compression stroke from flowing into the flow path 62.

Accordingly, the hydraulic shock absorber 10 carries out a damping operation as described below.

(Compression Stroke) (Flow Shown by Solid Line Arrows in FIGS. 1 and 2)

The pressure of the oil in the piston side oil chamber 27A rises, and pushes open the compression side damping valve 45A of the compression side flow path 45 in the damping force generating device 40 so as to generate the compression side damping force. The oil flowing out of the compression side damping valve 45A is separated into two portions in the compression side flow path 45, one portion of oil flows out of the compression side check valve 45B to the rod side oil chamber 27B through the outside flow path 11C of the cylinder 11, and the other portion of oil is discharged to the oil reservoir chamber 32 via the groove holes 44A and 44B of the center plate 44, the communication path 43A of the valve piece 43, the communication path 14A of the vehicle body side attaching member 14 and the like. The other portion of oil discharged to the oil reservoir chamber 32 compensates for the amount of oil corresponding to the forward moving volumetric capacity of the piston rod 12.

(Extension Stroke) (Flow Shown by Dashed Dotted Line Arrows in FIGS. 1 and 2)

The pressure of the oil in the rod side oil chamber 27B rises, and pushes open the extension side damping valve 46A of the extension side flow path 46 in the damping force generating device 40 through the outside flow path 11C of the cylinder 11 so as to generate the extension side damping force. The oil flowing out of the extension side damping valve 46A flows together with the oil replenished via the communication path 14A of the vehicle body side attaching member 14, the communication path 43A of the valve piece 43, the groove holes 44A and 44B of the center plate 44 and the like, and thereafter flows out to the piston side oil chamber 27A through the extension side check valve 46B. The oil replenished from the oil reservoir chamber 32 compensates for the amount of oil corresponding to the backward moving volumetric capacity of the piston rod 12.

Therefore, in accordance with the present embodiment, the following operations and effects can be achieved.

(a) In the hydraulic shock absorber 10, the damping force generating device 40 is provided between the piston side oil chamber 27A and the rod side oil chamber 27B of the cylinder 11, and in the compression stroke, the compression side flow path 45 for circulating the oil in the piston side oil chamber 27A of the cylinder 11 through the outside flow path 11C of the cylinder 11 toward the rod side oil chamber 27B is provided in the damping force generating device 40, the compression side damping valve 45A is provided in the upstream side of the compression side flow path 45, the compression side check valve 45B is provided in the downstream side thereof, the intermediate portion of the compression side damping valve 45A and the compression side check valve 45B in the compression side flow path 45 communicates with the oil reservoir chamber 32, while in the extension stroke, the extension side flow path 46 for circulating the oil in the rod side oil chamber 27B of the cylinder 11 through the outside flow path 11C of the cylinder 11 toward the piston side oil chamber 27A is provided in the damping force generating device 40, the extension side damping valve 46A is provided in the upstream side of the extension side flow path 46, the extension side check valve 46B is provided in the downstream side thereof, and the intermediate portion of the extension side damping valve 46A and the extension side check valve 46B in the extension side flow path 46 communicates with the oil reservoir chamber 32.

In the compression stroke, the oil with increased pressure in the piston side oil chamber 27A generates the compression side damping force through the compression side damping valve 45A in the upstream side of the compression side flow path 45 of the damping force generating device 40. The flow of the one portion of oil flowing out of the compression side damping valve 45A flows into the rod side oil chamber 27B through the outside flow path 11C of the cylinder 11 from the compression side check valve 45B. Further, the flow of the amount of oil corresponding to the forward moving volumetric capacity of the piston rod 12, which is the flow of the other portion of oil flowing out of the compression side damping valve 45A, flows into the oil reservoir chamber 32. At this time, the pressure of the rod side oil chamber 27B depends substantially only upon the pressure of the air chamber 31 pressurizing the oil reservoir chamber 32 (since the flow path resistance between the compression side check valve 45B in the downstream side of the compression side damping valve 45A and the outside flow path 11C of the cylinder 11 is small), and does not change depending on the setting of the flow path resistance of the compression side damping valve 45A. Accordingly, it is possible to avoid the pause in the damping force when reversing to the extension stroke.

In the extension stroke, the oil with increased pressure in the rod side oil chamber 27B generates the extension side damping force through the outside flow path 11C of the cylinder 11 and the extension side damping valve 46A in the upstream side of the extension side flow path 46 of the damping force generating device 40. The oil flowing out of the extension side damping valve 46A flows together with the amount of oil corresponding to the backward moving volumetric capacity of the piston rod 12 replenished from the oil reservoir chamber 32, and thereafter flows into the piston side oil chamber 27A through the extension side check valve 46B.

In this case, it is possible to make the pressure of the rod side oil chamber 27B a high positive pressure in the compression stroke so as to improve a damping response when reversing to the extension, by setting the pressure of the air chamber 31 pressurizing the oil reservoir chamber 32 to a high pressure.

(b) The damping force generating device 40 in the above (a) has the valve piece 43 which is fixed to the cylinder 11, is provided with the center plate 44 in the center along the axial direction of the outer periphery of the valve piece 43, is provided with the compression side damping valve 45A and the extension side check valve 46B on the one side in the axial direction with respect to the center plate 44 in the outer periphery of the valve piece 43, and is provided with the extension side damping valve 46A and the compression side check valve 45B on the other side, where the set of the compression side damping valve 45A and the extension side check valve 46B and the set of the extension side damping valve 46A and the compression side check valve 45B are arranged to be line-symmetric with respect to the center plate 44. Accordingly, it is possible to achieve both of the flow paths of the oil in the above (a) which flows from the piston side oil chamber 27A through the damping force generating device 40 into the rod side oil chamber 27B and the oil reservoir chamber 32 in the compression stroke and the flow path of the oil in the above (a) which flows from the rod side oil chamber 27B and the oil reservoir chamber 32 through the damping force generating device 40 into the piston side oil chamber 27A in the extension stroke that are short in flow path length and small in flow path resistance, and it is possible to make the flows of the oil smooth.

(c) The damping force generating device 40 in the above (b) fixes the valve piece 43 onto the center axis of the cylinder 11 at one end side within the piston side oil chamber 27A of the cylinder 11, is provided with the compression side flow path 45 and the extension side flow path 46 around the center plate 44, and communicates the compression side flow path 45 and the extension side flow path 46 with the oil reservoir chamber 32 via the groove holes 44A and 44B in the center plate 44 and the communication path 43A in the valve piece 43. Accordingly, it is possible to make the path communicating the intermediate portion between the compression side flow path 45 and the extension side flow path 46 of the damping force generating device 40 with the oil reservoir chamber 32 compact, and make the flow of the oil in the path smooth.

(d) The damping force generating device 40 in the above (b) or the above (c) is provided with the bypass flow path 52 communicating the piston side oil chamber 27A of the cylinder 11 with the rod side oil chamber 27B and the oil reservoir chamber 32, bypassing the compression side damping valve 45A and the extension side damping valve 46A, in the hollow portion provided on the center axis of the valve piece 43, and is provided with the externally operated damping force regulating valve 51 in the bypass flow path 52. Accordingly, it is possible to regulate a magnitude of the compression side damping force by using the damping force generating device 40.

Embodiment 2

FIGS. 5 to 8

Figure 5:
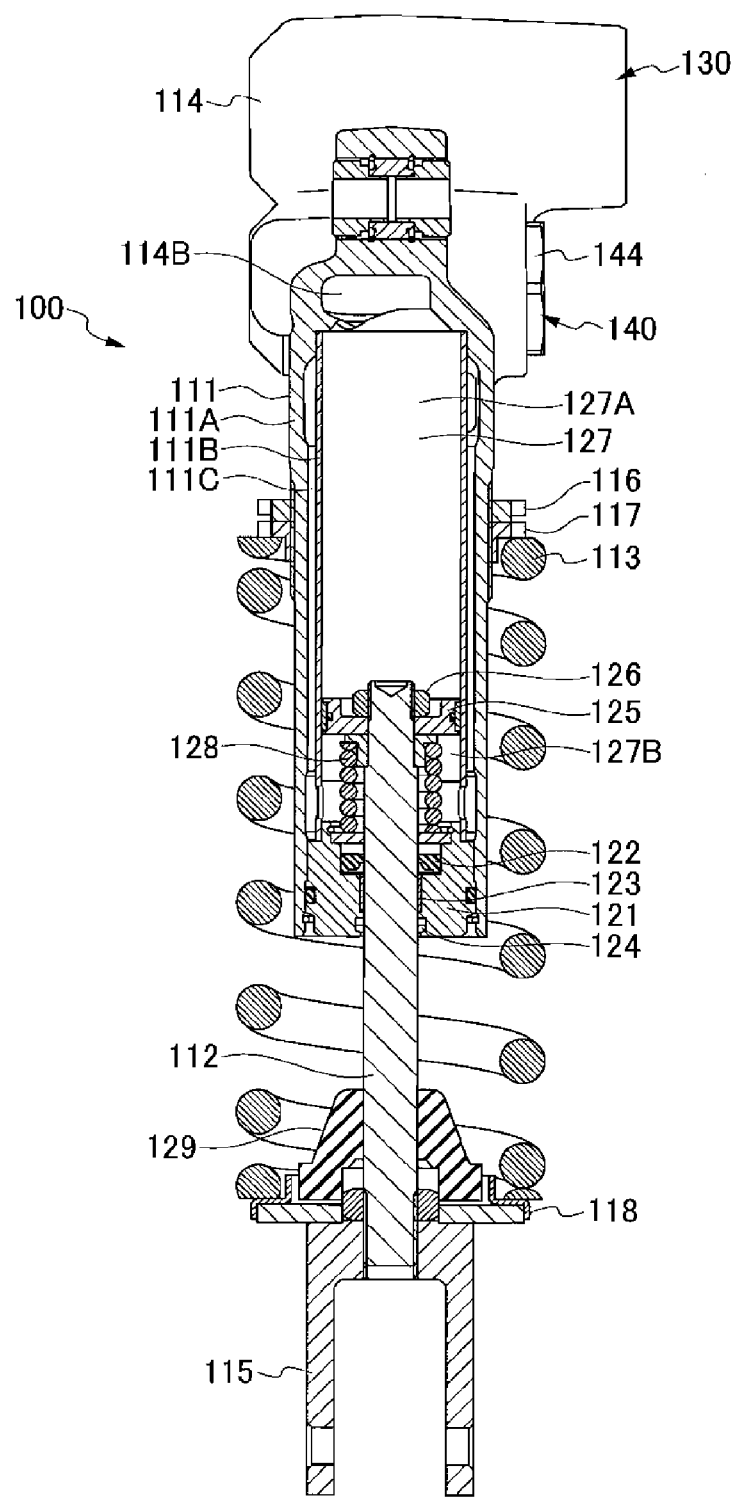
FIG. 5 is a cross sectional view showing a hydraulic shock absorber according to an Embodiment 2.
Figure 6:
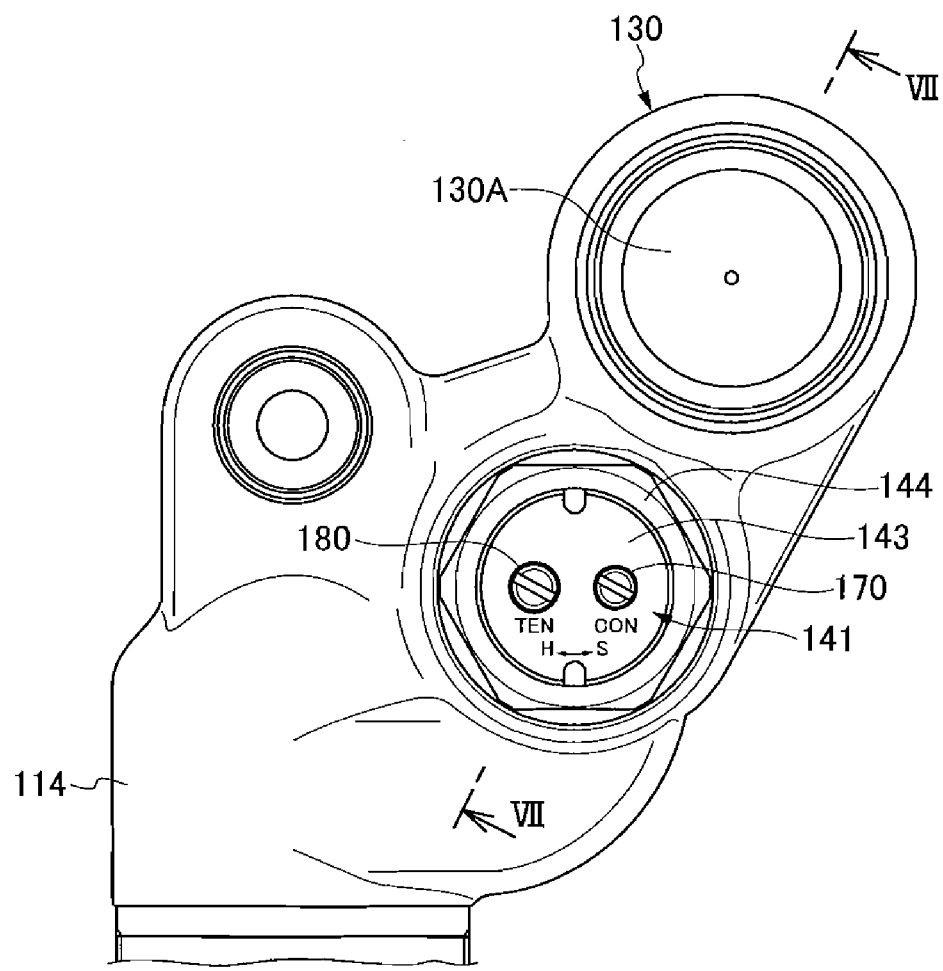
FIG. 6 is a close-up side view showing a damping force generating device area of FIG. 5.
Figure 7:
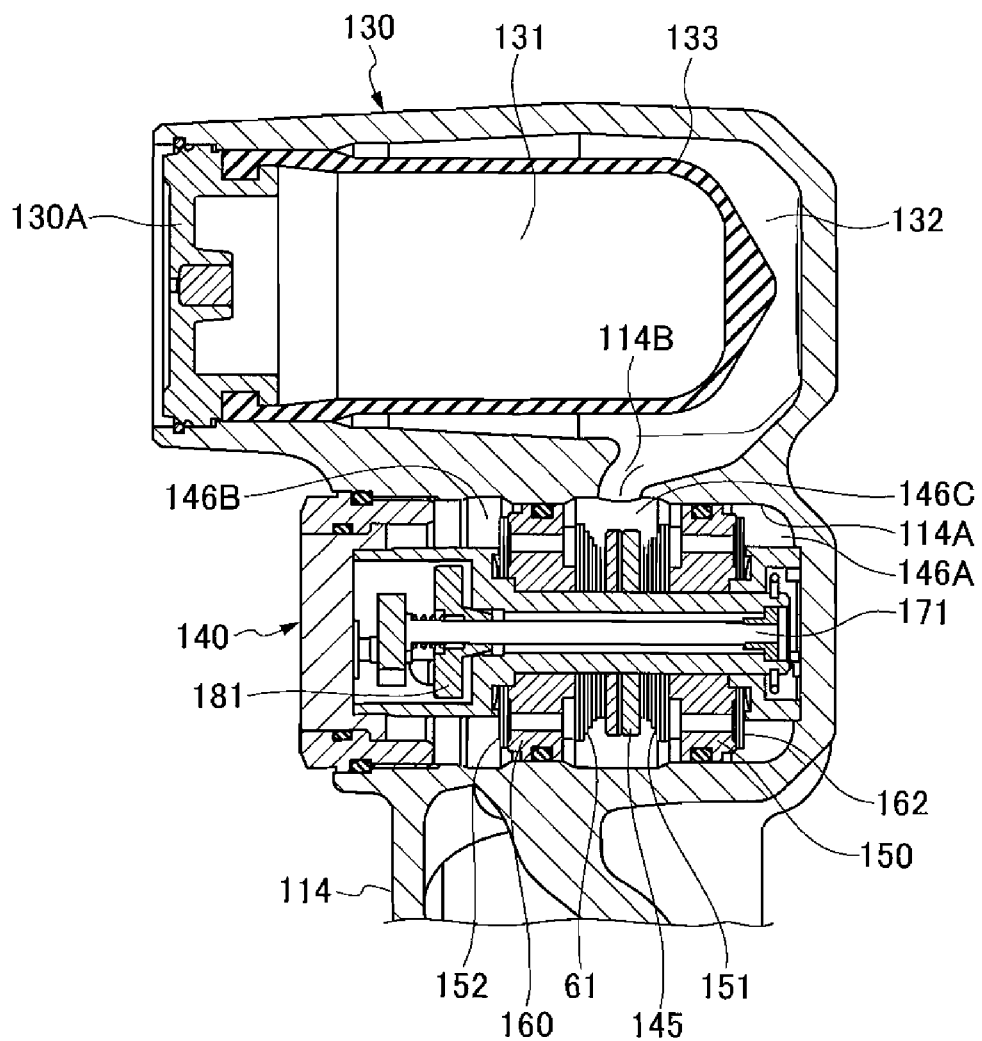
FIG. 7 is a cross sectional view taken along a line VII-VII of FIG. 6.

A hydraulic shock absorber 100 is structured, as shown in FIGS. 5 to 7, such that a piston rod 112 attached to an axle side is slidably inserted into an oil chamber 127 of a damper cylinder 111 attached to a vehicle body side, and a suspension spring 113 is interposed on an outer side portion of the cylinder 111 and the piston rod 112. The cylinder 111 is provided with a vehicle body side attaching member 114, and the piston rod 112 is provided with an axle side attaching member 115. A spring load regulating nut 116 is mounted on an outer peripheral portion of the cylinder 111, a spring receiver 117 supported by the spring load regulating nut 116 is provided, and a spring receiver 118 is provided on an outer side portion of the axle side attaching member 115. The suspension spring 113 is interposed between the spring receiver 117 and the spring receiver 118, and a set length (a spring load) of the suspension spring 113 is regulated by an upward and downward moving operation of the nut 116. A spring force of the suspension spring 113 absorbs an impact force that a vehicle receives from a road surface.

The cylinder 111 has a rod guide 121 through which the piston rod 112 passes, in its opening portion, as shown in FIG. 5. The rod guide 121 is inserted and attached in a liquid tight manner to the cylinder 111 to allow the piston rod 112 to slide freely in a liquid tight manner along an inner diameter portion having an oil seal 122, a bush 123 and a dust seal 124.

The hydraulic shock absorber 100 is structured such that the cylinder 111 is formed as a double tube constructed by an outer tube 111A and an inner tube 111B, the outer tube 111A is integrally formed with the vehicle body side attaching member 114, a large outer diameter portion of the rod guide 121 is fixed to a lower end inner periphery of the outer tube 111A, a lower end inner periphery of the inner tube 111B is fitted to a small outer diameter portion of the rod guide 121, and an upper end portion of the inner tube 111B is provided so as to abut on an upper end inner surface of the outer tube 111A. Further, a piston 125 inserted and attached to a leading end portion of the piston rod 112 is fixed by a nut 126, and an oil chamber 127 of the cylinder 111 is comparted into a piston side oil chamber 127A and a rod side oil chamber 127B by the piston 125 slidably inserted into an inner periphery of the inner tube 111B. Reference numeral 128 denotes a rebound spring, and reference numeral 129 denotes a bump rubber.

The hydraulic shock absorber 100 is structured such that a sub tank 130 is integrally formed in the vehicle body side attaching member 114, and an air chamber 131 and an oil reservoir chamber 132 which are provided within the sub tank 130 sealed by a cap 130A are separated by a bladder 133. The oil reservoir chamber 132 pressurized by a pressure of the air chamber 131 which is set to a high pressure via an air valve (not shown) provided in the cap 130A communicates with the oil chamber 127 of the cylinder 111, and a volumetric capacity (including a volumetric capacity corresponding to a temperature extension of the oil) of the piston rod 112 which moves forward and backward with respect to the oil chamber 127 of the cylinder 111 is compensated by the oil reservoir chamber 132.

The hydraulic shock absorber 100 is provided with a damping force generating device 140 between the piston side oil chamber 127A and the rod side oil chamber 127B of the cylinder 111.

Figure 8:
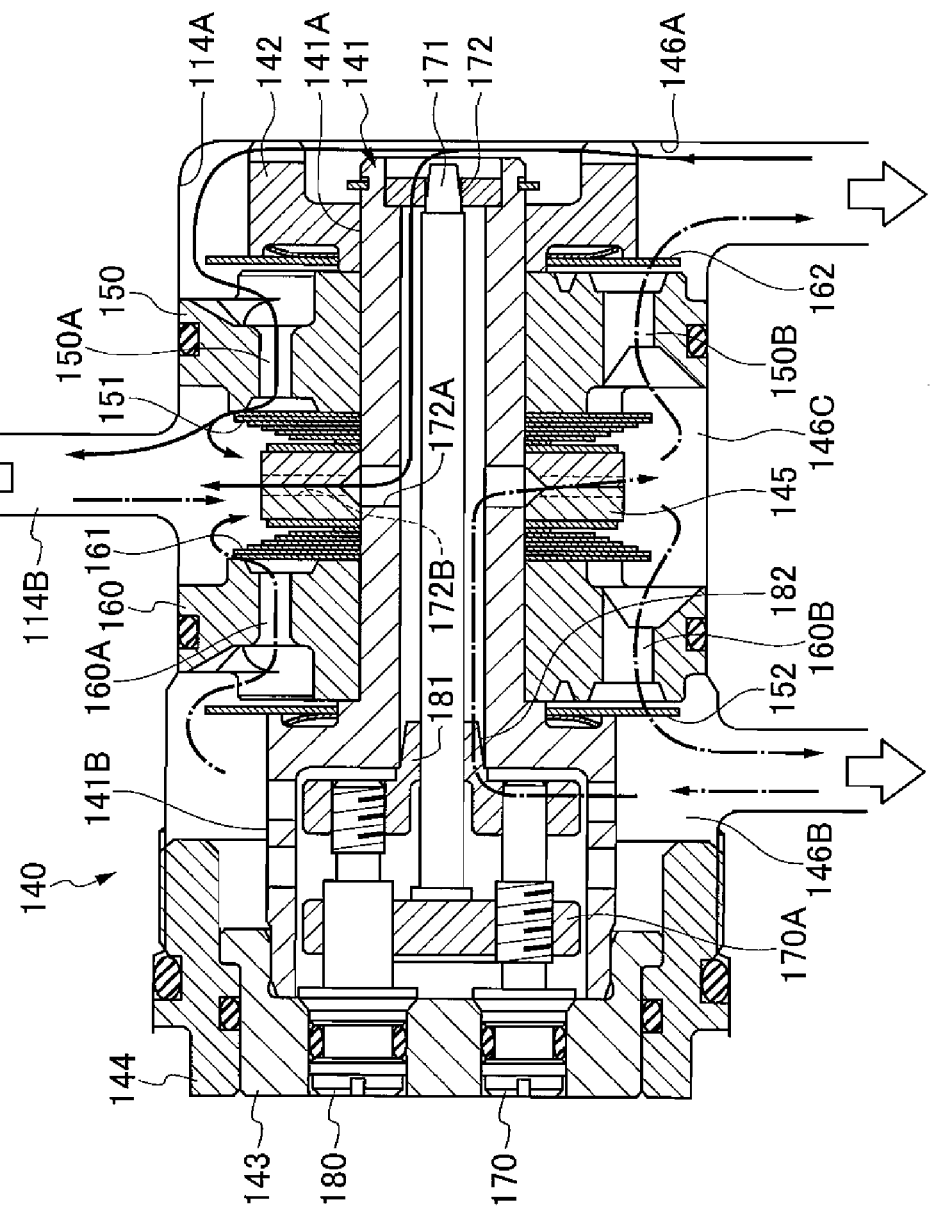
FIG. 8 is a close-up cross sectional view showing the damping force generating device in FIG. 6.
Figure 9:
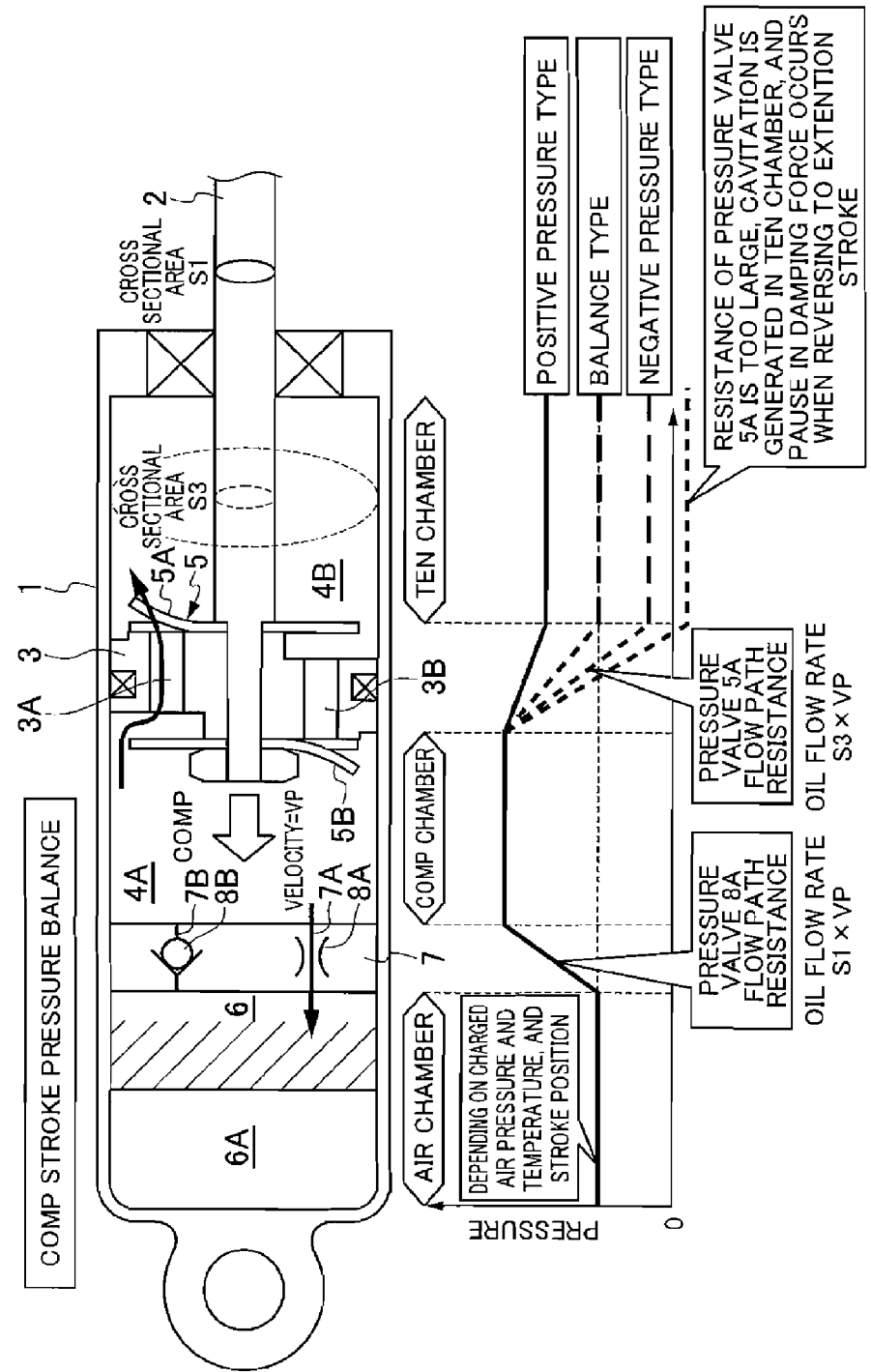
FIG. 9 is a schematic cross sectional view showing a related art example.

The damping force generating device 140 is inserted from outside to a valve accommodating hole 114A between the damper cylinder 111 and the sub tank 130 in the vehicle body side attaching member 114 to be housed therein, in a state sub-assembled in a valve unit 140A shown in FIG. 8.

The valve unit 140A of the damping force generating device 140 has a valve piece 141, an inside valve holder 142 fitted to a small diameter portion 141A in an inner end side of the valve piece 141, an outside valve holder 143 fitted to a large diameter portion 141B in an outer end side of the valve piece 141 from outside to be engaged in an axial direction, and a cap 144 fitted in a liquid tight manner to the outside valve holder 143 from outside to be engaged in an axial direction.

The valve unit 140A of the damping force generating device 140 is further provided with a center plate 145 in the center along an axial direction of an outer periphery of the small diameter portion 141A of the valve piece 141, is loaded a compression side check valve 152, an extension side piston 160, and an extension side damping valve 161 in this order from a side of a step surface with the large diameter portion 141B in an axial direction with respect to the center plate 145 in the outer periphery of the small diameter portion 141A of the valve piece 141, and is loaded an extension side check valve 162, a compression side piston 150, and a compression side damping valve 151 in this order from a side of an end surface of the inside valve holder 142. The set of the compression side check valve spring 152, the extension side piston 160 and the extension side damping valve 161 and the set of the extension side check valve 162, the compression side piston 150 and the compression side damping valve 151 are arranged to be line-symmetric with respect to the center plate 145, and are pinched and fixed together with the center plate 145, between the step surface of the small diameter portion 141A and the large diameter portion 141B of the valve piece 141 and the end surface of the inside valve holder 142.

The valve unit 140A of the damping force generating device 140 is inserted into the valve accommodating hole 114A from outside, and is fixed in a state in which a leading end surface of the inside valve holder 142 abuts on a bottom surface in an axial direction of the valve accommodating hole 114A, and the cap 144 is screwed in a liquid tight manner to an opening thread portion of the valve accommodating hole 114A. In the damping force generating device 140, outer peripheries of the compression side piston 150 and the extension side piston 160 are fixed to an inner periphery of the valve accommodating hole 114A in a liquid tight manner, a space close to an opposite extension side piston of the compression side piston 150 in the valve accommodating hole 114A serves as an extension and compression common flow path 146A communicating with the piston side oil chamber 127A, a space close to an opposite compression side piston of the extension side piston 160 in the valve accommodating hole 114A serves as an extension and compression common flow path 146B communicating with the rod side oil chamber 127B via an outside flow path 111C, which will be described later, of the cylinder 111, and an annular space between the compression side piston 150 and the extension side piston 160 around the center plate 145 in the valve accommodating hole 114A serves as an extension and compression common flow path 146C communicating with the oil reservoir chamber 132 via the communication path 114B provided in the vehicle body side attaching member 114. Further, the damping force generating device 140 is provided with a compression side flow path 150A which is opened and closed by the compression side damping valve 151 and an extension side flow path 150B which is opened and closed by an extension side check valve 162 in the compression side piston 150, and is provided with a compression side flow path 160B which is opened and closed by a compression side check valve 152 and an extension side flow path 160A which is opened and closed by an extension side damping valve 161 in the extension side piston 160. The damping force generating device 140 communicates the piston side oil chamber 127A and the rod side oil chamber 127B in the cylinder 111 via the extension and compression common flow paths 146A, 146B and 146C provided in the vehicle body side attaching member 114, the compression side flow path 150A and the extension side flow path 150B provided in the compression side piston 150, the compression side flow path 160B and the extension side flow path 160A provided in the extension side piston 160, and the outside flow path 111C provided in the annular gap between the outer tube 111A and the inner tube 111B of the cylinder 111 (the piston 125 does not have the flow path communicating the piston side oil chamber 127A with the rod side oil chamber 127B).

Accordingly, in the hydraulic shock absorber 100 in the compression stroke, the compression side flow path (the extension and compression common flow paths 146A, 146B and 146C and the compression side flow paths 150A and 160B) for circulating the oil in the piston side oil chamber 127A of the cylinder 111 through the outside flow path 111C of the cylinder 111 toward the rod side oil chamber 127B is provided in the damping force generating device 140, the compression side damping valve 151 is provided in an upstream side of the compression side flow path (the extension and compression common flow paths 146A, 146B and 146C, and the compression side flow paths 150A and 160B), the compression side check valve 152 is provided in a downstream side thereof, and an intermediate portion of the compression side damping valve 151 and the compression side check valve 152 in the compression side flow path (the extension and compression common flow paths 146A, 146B and 146C, and the compression side flow paths 150A and 160B) communicates with the oil reservoir chamber 132 via the extension and compression common flow path 146C and the communication path 114B.

On the other hand, in the extension stroke, the extension side flow path (the extension and compression common flow paths 146A, 146B and 146C, and the extension side flow paths 150B and 160A) for circulating the oil in the rod side oil chamber 127B of the cylinder 111 through the outside flow path 111C of the cylinder 111 toward the piston side oil chamber 127A is provided in the damping force generating device 140, the extension side damping valve 161 is provided in an upstream side of the extension side flow path (the extension and compression common flow paths 146A, 146B and 146C, and the extension side flow paths 150B and 160A), the extension side check valve 162 is provided in a downstream side thereof, and an intermediate portion of the extension side damping valve 161 and the extension side check valve 162 in the extension side flow path (the extension and compression common flow paths 146A, 146B and 146C, and the extension side flow paths 150B and 160A) communicates with the oil reservoir chamber 132 via the extension and compression common flow path 146C, and the communication path 114B.

The damping force generating device 140 may be provided with a compression side bypass flow path 172 and an extension side bypass flow path 182 which communicate the piston side oil chamber 127A and the rod side oil chamber 127B of the cylinder 111 with the oil reservoir chamber 132, bypassing the compression side damping valve 151 and the extension side damping valve 161, in a hollow portion provided on the center axis of the small diameter portion 141A to the large diameter portion 141B of the valve piece 141 as shown in FIG. 8, if necessary. The compression side damping force can be regulated by regulating an opening area of the compression side bypass flow path 172 by means of a compression side damping force regulating valve 171, which is externally operated by a compression side adjuster 170 provided in the outside valve holder 143. The compression side bypass flow path 172 is open to the extension and compression common flow path 146A, and is open to the extension and compression common flow path 146C via a hole 172A provided in the valve piece 141, and a hole 172B provided in the center plate 145. The extension side damping force can be regulated by regulating an opening area of the extension side bypass flow path 182 by means of an extension side damping force regulating valve 181, which is externally operated by an extension side adjuster 180 provided in the outside valve holder 143. The extension side bypass flow path 182 is open to the extension and compression common flow path 146B, and is open to the extension and compression common flow path 146C via the hole 172A provided in the valve piece 141, and the hole 172B provided in the center plate 145.

The compression side adjuster 170 is pivoted in a liquid tight manner on the outside valve holder 143 to be externally rotated. A slider 170A is screwed with a male thread portion of the compression side adjuster 170, and the slider 170A moving due to the rotation of the compression side adjuster 170 pushes a rod-like base end portion of the compression side damping force regulating valve 171, and moves forward and backward a leading end needle valve of the compression side damping force regulating valve 171 with respect to the opening of the compression side bypass flow path 172. Further, the extension side adjuster 180 is pivoted in a liquid tight manner on the outside valve holder 143 to be externally rotated. The extension side damping force regulating valve 181 is loosely inserted around the rod of the compression side damping force regulating valve 171, and a male thread portion of the extension side adjuster 180 is screwed with the flange portion thereof, and moves forward and backward a leading end needle valve of the extension side damping force regulating valve 181 moving due to the rotation of the extension side adjuster 180 with respect to the opening of the extension side bypass flow path 182. An intermediate shaft portion of the extension side adjuster 180 is inserted into the slider 170A of the compression side adjuster 170 so as to prevent the slider 170A from rotating. A leading end shaft portion of the compression side adjuster 170 is inserted into a flange portion of the extension side damping force regulating valve 181 so as to prevent the extension side damping force regulating valve 181 from rotating.

Accordingly, the hydraulic shock absorber 100 carries out a damping operation as described below.

(Compression Stroke) (Flow Shown by Solid Line Arrows in FIG. 8)

The pressure of the oil in the piston side oil chamber 127A rises, and pushes open the compression side damping valve 151 of the compression side flow path 150 of the compression side piston 150 in the damping force generating device 140 so as to generate the compression side damping force. The oil flowing out of the compression side damping valve 151 to the extension and compression common flow path 146C is separated into two portions in the extension and compression common flow path 146C, one portion of oil flows out of the compression side check valve 152 of the compression side flow path 160B in the extension side piston 160 to the rod side oil chamber 127B through the outside flow path 111C of the cylinder 111, and the other portion of oil is discharged to the oil reservoir chamber 132. The other portion of oil discharged to the oil reservoir chamber 132 compensates the amount of oil corresponding to the forward moving volumetric capacity of the piston rod 112.

(Extension Stroke) (Flow Shown by Dashed Dotted Line Arrows in FIG. 8)

The pressure of the oil in the rod side oil chamber 127B rises, and pushes open the extension side damping valve 161 of the extension side flow path 160A of the extension side piston 160 in the damping force generating device 140 through the outside flow path 111C of the cylinder 111 so as to generate the extension side damping force. The oil flowing out of the extension side damping valve 161 to the extension and compression common flow path 146C flows together with the oil replenished from the oil reservoir chamber 132, and thereafter flows out to the piston side oil chamber 127A through the extension side check valve 162 of the extension side flow path 150B of the compression side piston 150. The oil replenished from the oil reservoir chamber 132 compensates the amount of oil corresponding to the backward moving volumetric capacity of the piston rod 112.

Therefore, according to the present embodiment, the following operations and effects can be achieved.

(a) In the hydraulic shock absorber 100, the damping force generating device 140 is provided between the piston side oil chamber 127A and the rod side oil chamber 127B of the cylinder 111, and in the compression stroke, the compression side flow path (the extension and compression common flow paths 146A, 146B and 146C, and the compression side flow paths 150A and 160B) for circulating the oil in the piston side oil chamber 127A of the cylinder 111 through the outside flow path 111C of the cylinder 111 toward the rod side oil chamber 127B is provided in the damping force generating device 140, the compression side damping valve 151 is provided in the upstream side of the compression side flow path (the extension and compression common flow paths 146A, 146B and 146C, and the compression side flow paths 150A and 160B), the compression side check valve 152 is provided in the downstream side thereof, the intermediate portion of the compression side damping valve 151 and the compression side check valve 152 in the compression side flow path (the extension and compression common flow paths 146A, 146B and 146C, and the compression side flow paths 150A and 160B) communicates with the oil reservoir chamber 32, while in the extension stroke, the extension side flow path (the extension and compression common flow paths 146A, 146B and 146C, and the extension side flow paths 150B and 160A) for circulating the oil in the rod side oil chamber 127B of the cylinder 111 through the outside flow path 111C of the cylinder 111 toward the piston side oil chamber 127A is provided in the damping force generating device 140, the extension side damping valve 161 is provided in the upstream side of the extension side flow path (the extension and compression common flow paths 146A, 146B and 146C, and the extension side flow paths 150B and 160A), the extension side check valve 162 is provided in the downstream side thereof, and the intermediate portion of the extension side damping valve 161 and the extension side check valve 162 in the extension side flow path (the extension and compression common flow paths 146A, 146B and 146C, and the extension side flow paths 150B and 160A) communicates with the oil reservoir chamber 132.

In the compression stroke, the oil with increased pressure in the piston side oil chamber 127A generates the compression side damping force through the compression side damping valve 151 in the upstream side of the compression side flow path (the extension and compression common flow paths 146A, 146B and 146C, and the compression side flow paths 150A and 160B) of the damping force generating device 140. The flow of the one portion of oil flowing out of the compression side damping valve 151 flows into the rod side oil chamber 127B through the outside flow path 111C of the cylinder 111 from the compression side check valve 152. Further, the flow of the amount of oil corresponding to the forward moving volumetric capacity of the piston rod 112, which is the flow of the other portion of oil flowing out of the compression side damping valve 151, flows into the oil reservoir chamber 132. At this time, the pressure of the rod side oil chamber 127B depends substantially only upon the pressure of the air chamber 131 pressurizing the oil reservoir chamber 132 (since the flow path resistance between the compression side check valve 152 in the downstream side of the compression side damping valve 151 and the outside flow path 111C of the cylinder 111 is small), and does not change depending on the setting of the flow path resistance of the compression side damping valve 151. Accordingly, it is possible to avoid the pause in the damping force when reversing to the extension stroke.

In the extension stroke, the oil with increased pressure in the rod side oil chamber 127B generates the extension side damping force through the outside flow path 111C of the cylinder 111 and the extension side damping valve 161 in the upstream side of the extension side flow path (the extension and compression common flow paths 146A, 146B and 146C, and the extension side flow paths 150B and 160A) of the damping force generating device 140. The oil flowing out of the extension side damping valve 161 flows together with the amount of oil corresponding to the backward moving volumetric capacity of the piston rod 112 replenished from the oil reservoir chamber 132, and thereafter flows into the piston side oil chamber 127A through the extension side check valve 162.

In this case, it is possible to make the pressure of the rod side oil chamber 127B a high positive pressure in the compression stroke so as to improve a damping response when reversing to the extension, by setting the pressure of the air chamber 131 pressurizing the oil reservoir chamber 132 to a high pressure.

(b) The damping force generating device 140 in the above (a) has the valve piece 141 which is fixed to the cylinder 111, is provided with the center plate 145 in the center along the axial direction of the outer periphery of the valve piece 141, is provided with the compression side damping valve 151 and the extension side check valve 162 on the one side in the axial direction with respect to the center plate 145 in the outer periphery of the valve piece 141, and is provided with the extension side damping valve 161 and the compression side check valve 152 on the other side, where the set of the compression side damping valve 151 and the extension side check valve 162 and the set of the extension side damping valve 161 and the compression side check valve 152 are arranged to be line-symmetric with respect to the center plate 145. Accordingly, it is possible to achieve both of the flow path of the oil in the above (a) which flows from the piston side oil chamber 127A through the damping force generating device 140 into the rod side oil chamber 127B and the oil reservoir chamber 132 in the compression stroke and the flow path of the oil mentioned in the above (a) which flows from the rod side oil chamber 127B and the oil reservoir chamber 132 through the damping force generating device 140 into the piston side oil chamber 127A in the extension stroke that are short in flow path length and small in flow path resistance, and it is possible to make the flows of the oil smooth.

(c) The damping force generating device 140 in the above (b) is provided with the bypass flow paths 172 and 182 communicating the piston side oil chamber 127A of the cylinder 111 with the rod side oil chamber 127B and the oil reservoir chamber 132, bypassing the compression side damping valve 151 and the extension side damping valve 161, in the hollow portion provided on the center axis of the valve piece 141, and is provided with the externally operated damping force regulating valves 171 and 181 in the bypass flow paths 172 and 182. Accordingly, it is possible to regulate a magnitude of the compression side damping force and the extension side damping force by using the damping force generating device 140.

Embodiment 3

Figure 10:
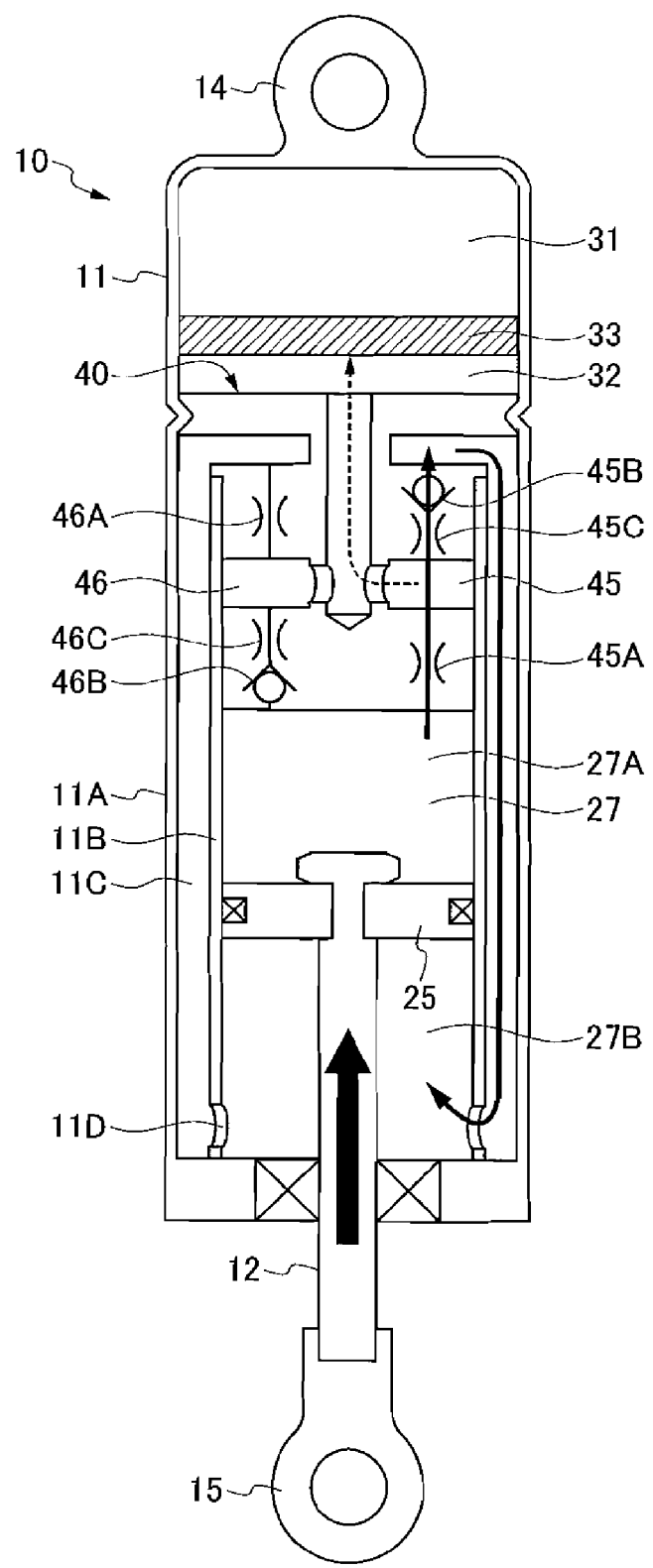
FIG. 10 is a schematic cross sectional view showing a basic structure of a hydraulic shock absorber in accordance with an Embodiment 3.
Figure 11:
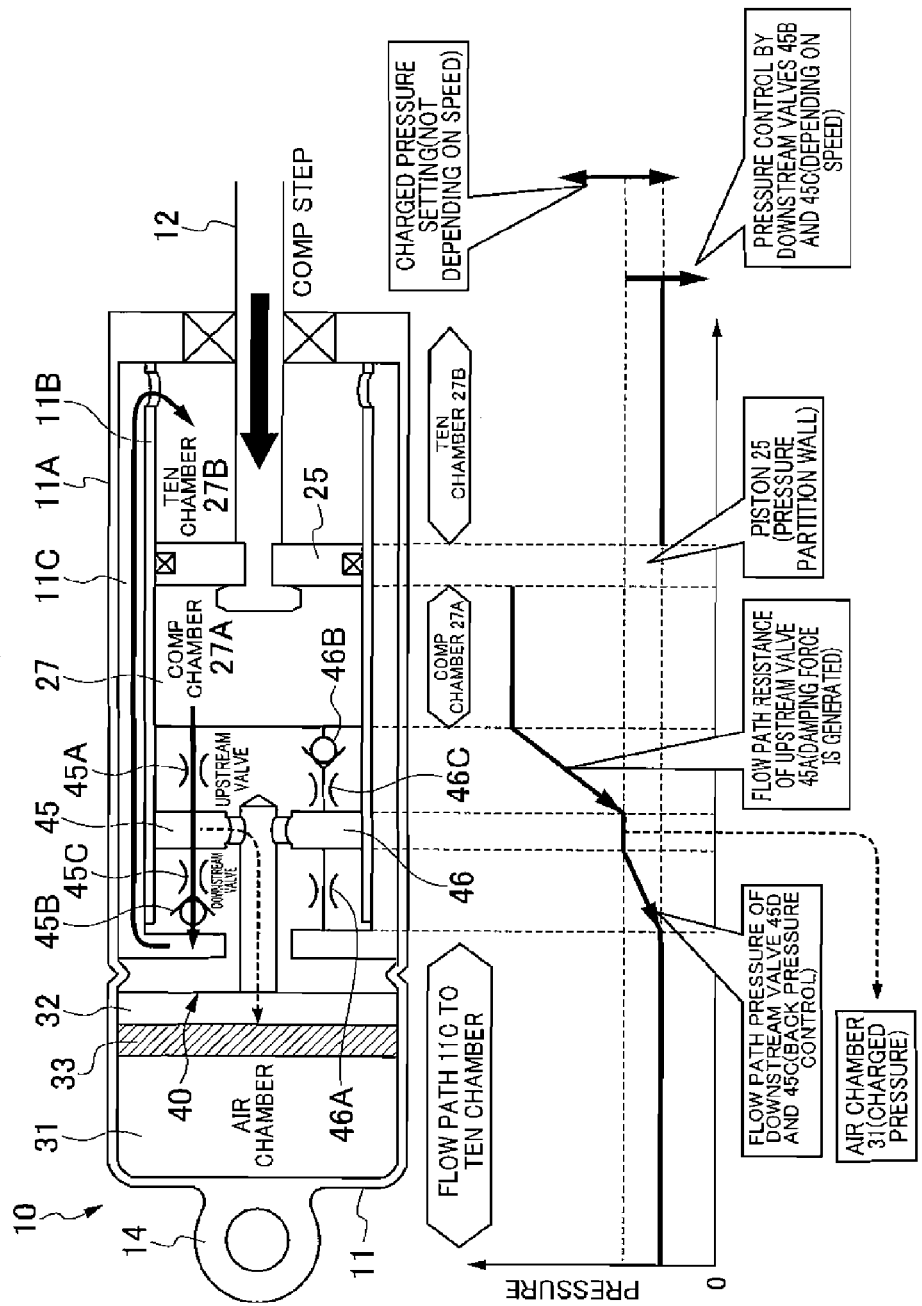
FIG. 11 is a schematic cross sectional view showing a flow of oil in a compression stroke of the hydraulic shock absorber.
Figure 12:
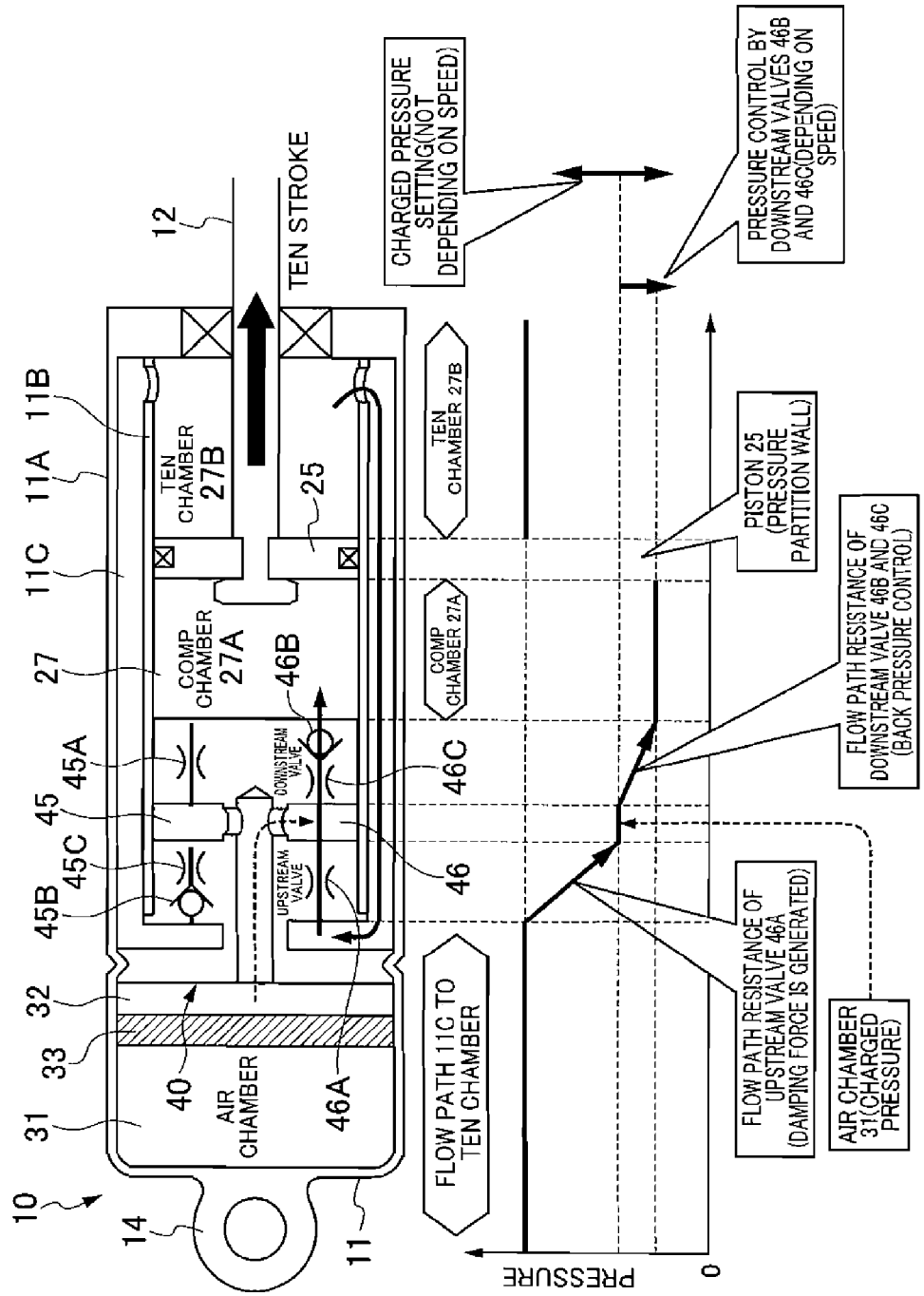
FIG. 12 is a schematic cross sectional view showing a flow of oil in an extension stroke of the hydraulic shock absorber.
Figure 13:
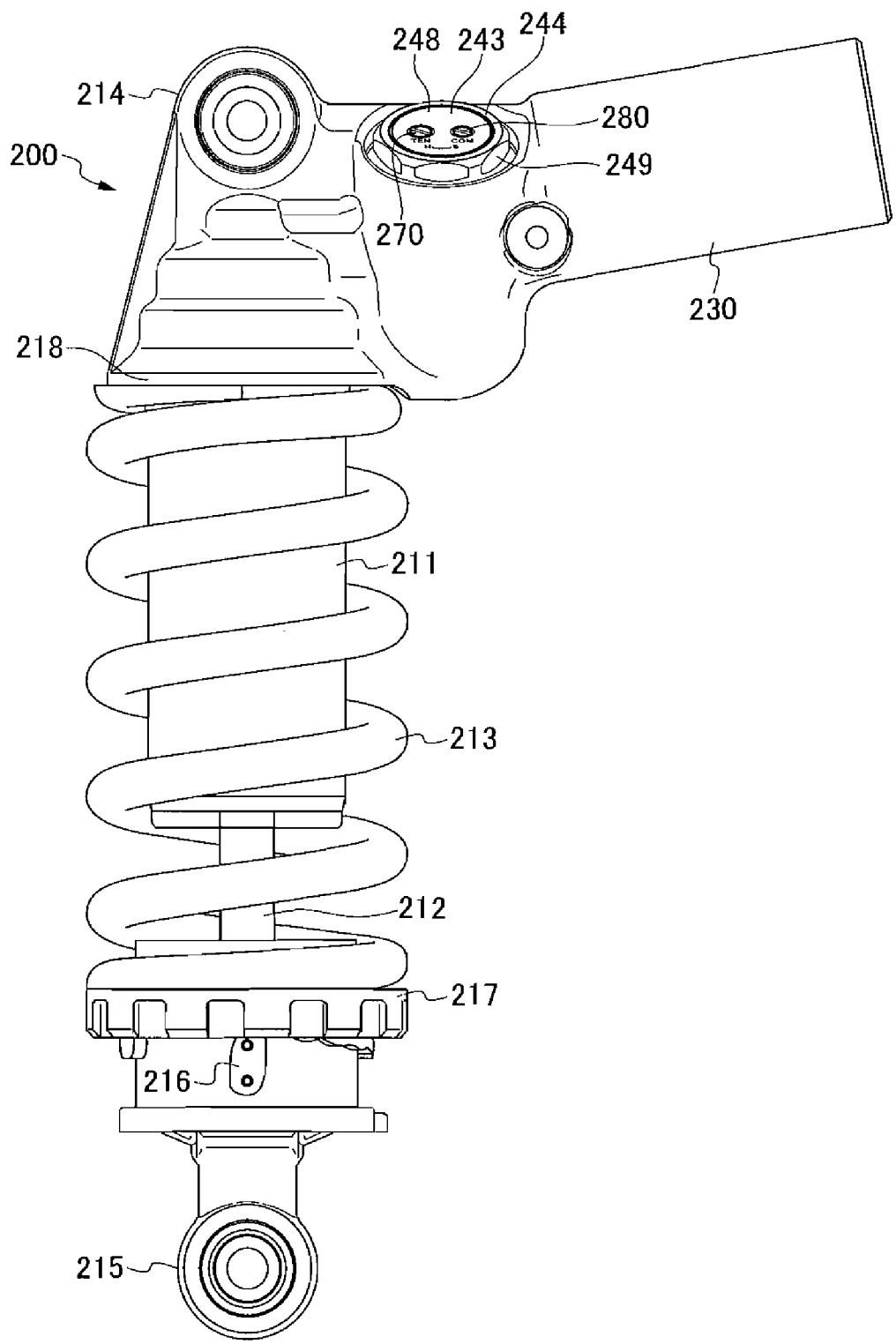
FIG. 13 is a front elevational view showing an outer appearance of a hydraulic shock absorber in accordance with an Embodiment 4.

FIGS. 10 to 12

The difference between an Embodiment 3 and the Embodiment 1 lies in a structure of the damping force generating device 40.

Specifically, the damping force generating device 40 is structured, as shown in FIG. 10, such that a compression side damping force generating means 45C is added to the compression side check valve 45B provided in a downstream side of the compression side flow path 45. The compression side damping force generating means 45C can be constructed by using a laminated disc valve as the compression side check valve 45B, and/or using a throttle flow path as the compression side flow path 45 provided with the compression side check valve 45B.

Further, the damping force generating device 40 may be structured such that an extension side damping force generating means 46C is added to the extension side check valve 46B provided in a downstream side of the extension side flow path 46. The extension side damping force generating means 46C can be constructed by using a laminated disc valve as the extension side check valve 46B, and/or using a throttle flow path as the extension side flow path 46 provided with the extension side check valve 46B.

In accordance with this structure, in the compression stroke, the oil with increased pressure in the piston side oil chamber 27A generates the compression side damping force through the compression side damping valve 45A in the upstream side of the compression side flow path 45 of the damping force generating device 40. One flow of the oil flowing out through the compression side damping valve 45A flows into the rod side oil chamber 27B through the compression side check valve 45B, the outside flow path 11C of the cylinder 11 and a hole flow path 11D provided in the inner tube 11B. Further, another flow of the oil flowing out through the compression side damping valve 45A in an amount corresponding to the volumetric capacity of the forward movement of the piston rod 12 flows into the oil reservoir chamber 32. At this time, the pressure of the rod side oil chamber 27B depends substantially only on the pressure of the air chamber 31 pressurizing the oil reservoir chamber 32, and the flow path resistance of the compression side damping force generating means 45C added to the compression side check valve 45B provided in the downstream side of the compression side damping valve 45A, and does not fluctuate depending on setting of the flow path resistance of the compression side damping valve 45A. Accordingly, it is possible to avoid a pause in a damping force when reversing to the extension stroke.

In the extension stroke, the oil with increased pressure in the rod side oil chamber 27B passes through the outside flow path 11C of the cylinder 11 and the hole flow path 11D provided in the inner tube 11B, then through the extension side damping valve 46A in the upstream side of the extension side flow path 46 of the damping force generating device 40 so as to generate the extension side damping force. The oil flowing out through the extension side damping valve 46A conflows with the oil in an amount corresponding to the volumetric capacity of the backward movement of the piston rod 12 which is replenished from the oil reservoir chamber 32, and thereafter flows into the piston side oil chamber 27A through the extension side check valve 46B.

Further, as shown in FIG. 11, in the compression stroke, while one flow of the oil flowing out through the compression side damping valve 45A in the upstream side flows into the rod side oil chamber 27B through the compression side check valve 45B and the outside flow path 11C of the cylinder 11, the compression side check valve 45B carries out a compression side damping force generating function as well as a check function. The compression side check valve 45B generates a damping force ΔF depending on the piston speed, and a pressure Pr of the rod side oil chamber 27B becomes a value obtained by subtracting the value ΔF from the pressure Pa of the air chamber 31 pressurizing the oil reservoir chamber 32, namely, a value controlled depending on the piston speed.

The pressure Pr of the rod side oil chamber 27B being controlled depending on the piston speed in the compression stroke as described above means that it is possible to control a rise characteristic of the damping force when reversing to the extension stroke depending on the piston speed. When the piston speed is high, the value ΔF becomes large due to the throttle of the compression side check valve 45B, and the value Pr becomes small. Therefore, the rise of the damping force when reversing to the extension stroke becomes gentle so as to improve a ride quality. When the piston speed is low, the value ΔF generated by the throttle of the compression side check valve 45B becomes small, and the value Pr becomes large. Therefore, the rise of the damping force when reversing to the extension stroke becomes sharp so as to suppress a wobbliness of the vehicle body and improve a driving stability.

At this time, while a total amount of the compression side damping force becomes a total amount of the damping force of the compression side damping valve 45A and the damping force of the compression side check valve 45B, the damping force of the compression side damping valve 45A is made larger in the normal setting. Thus, the total amount of the compression side damping force largely depends on the damping force of the compression side damping valve 45A.

In accordance with this structure, as shown in FIG. 12, in the extension stroke, while one flow of the oil flowing out through the extension side damping valve 46A in the upstream side flows into the piston side oil chamber 27A through the extension side check valve 46B and the outside flow path 11C of the cylinder 11, the extension side check valve 46B carries out an extension side damping force generating function as well as a check function. The extension side check valve 46B generates the damping force ΔF depending on the piston speed, and a pressure Pp of the piston side oil chamber 27A becomes a value obtained by subtracting the value ΔF from the pressure Pa of the air chamber 31 pressurizing the oil reservoir chamber 32, namely, a value controlled depending on the piston speed.

The pressure Pp of the piston side oil chamber 27A being controlled depending on the piston speed in the extension stroke as described above means that it is possible to control a rise characteristic of the damping force when reversing to the compression stroke depending on the piston speed. When the piston speed is high, the value ΔF becomes large due to the throttle of the extension side check valve 46B, and the value Pp becomes small. Therefore, the rise of the damping force when reversing to the compression stroke becomes gentle so as to improve a ride quality. When the piston speed is low, the value ΔF generated by the throttle of the extension side check valve 46B becomes small, and the value Pp becomes large. Therefore, the rise of the damping force when reversing to the compression stroke becomes sharp so as to suppress a wobbliness of the vehicle body and improve a driving stability.

At this time, while a total amount of the extension side damping force becomes a total amount of the damping force of the extension side damping valve 46A and the damping force of the extension side check valve 46B, the damping force of the extension side damping valve 46A is made larger in the normal setting. Thus, the total amount of the extension side damping force largely depends on the damping force of the extension side damping valve 46A.

Embodiment 4

FIGS. 13 to 17

A hydraulic shock absorber 200 is structured, as shown in FIGS. 13 to 17, such that a piston rod 212 attached to an axle side is slidably inserted into an oil chamber 227 of a damper cylinder 211 attached to a vehicle body side, and a suspension spring 213 is interposed on an outer side portion of the damper cylinder 211 and the piston rod 212.

The damper cylinder 211 is provided with a vehicle body side attaching member 214, and the piston rod 212 is provided with an axle side attaching member 215. A spring load adjusting mechanism 216 is mounted on an outer peripheral portion of the piston rod 212, a spring receiver 217 is supported by the spring load adjusting mechanism 216 and a spring receiver 218 is provided on an outer side portion of the damper cylinder 211. The suspension spring 213 is interposed between the spring receiver 217 and the spring receiver 218, and a set length (a spring load) of the suspension spring 213 is adjusted based on an upward and downward moving operation of the spring load adjusting mechanism 216. A spring force of the suspension spring 213 absorbs an impact force that a vehicle receives from a road surface.

Figure 14:
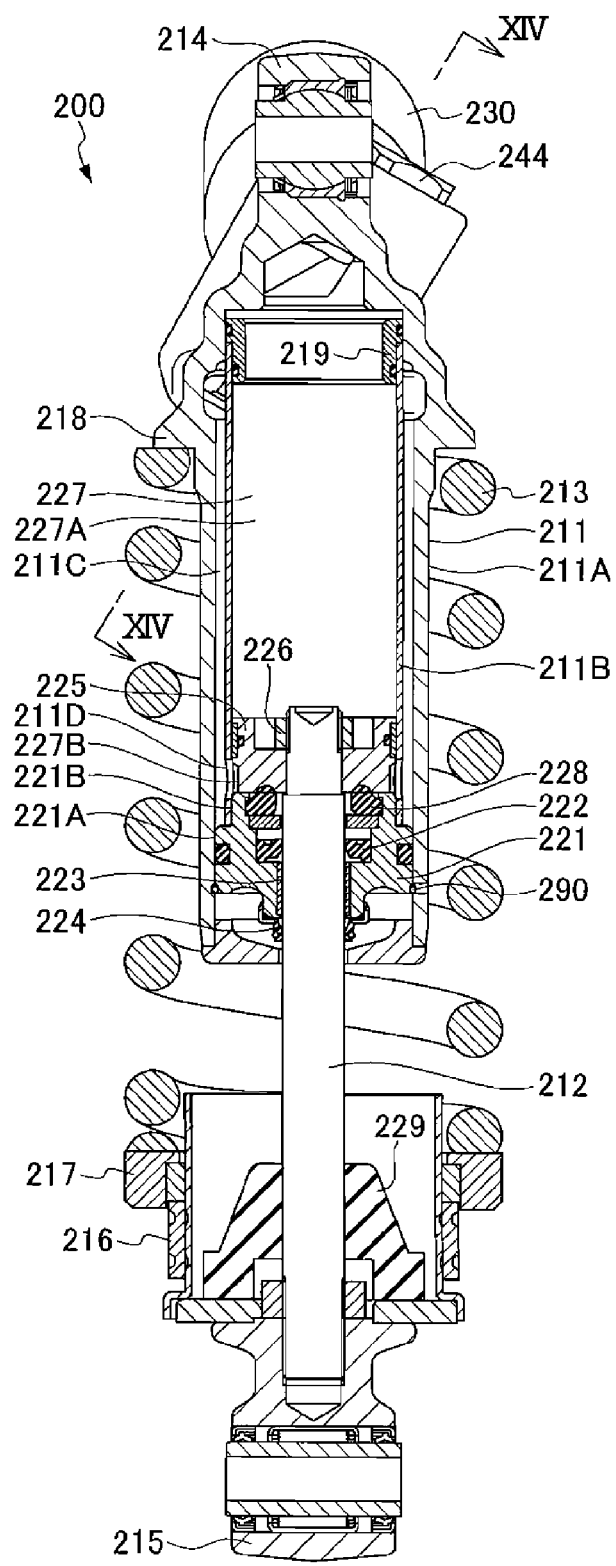
FIG. 14 is a cross sectional view showing a hydraulic shock absorber.

The damper cylinder 211 is provided in its opening portion with a rod guide 221 through which the piston rod 212 passes, as shown in FIG. 14. The rod guide 221 is inserted and attached in a liquid tight manner to an inner periphery of an outer tube 211A, which will be described later, via an O-ring (the O-ring is loaded to an annular groove in an outer periphery of the rod guide 221), and the piston rod 212 is slidably provided in a liquid tight manner in an inner diameter portion having an oil seal 222, a bush 223 and a dust seal 224.

The hydraulic shock absorber 200 has a double tube in which an inner tube 211B is inserted into the outer tube 211A formed by the damper cylinder 211, the outer tube 211A is integrally formed with the vehicle body side attaching member 214, a large outer diameter portion 221A of the rod guide 221 is fitted and fixed to a lower end side inner periphery of the outer tube 211A, a lower end inner periphery of the inner tube 211B is fitted and fixed to a small outer diameter portion 221B of the rod guide 221, and an upper end outer periphery of the inner tube 211B is fitted to an upper end inner periphery of the outer tube 211A. In addition, a collar 219 is attached to an upper end portion of the inner tube 211B, an O-ring is loaded to an annular groove provided in each of outer peripheries forming two stages of the large outer diameter portion and the small outer diameter portion in the collar 219, an upper end inner periphery of the inner tube 211B is press-fitted in a liquid tight manner to the small outer diameter portion of the collar 219, and the upper end outer periphery of the inner tube 211B and the large outer diameter portion of the collar 219 are fitted in a liquid tight manner to the upper end inner periphery of the outer tube 211A. Further, a piston 225 inserted and attached to a leading end portion of the piston rod 212 is fixed by a nut 226, and an oil chamber 227 of the damper cylinder 211 is comparted into a piston side oil chamber 227A and a rod side oil chamber 227B by the piston 225 slidably inserted into an inner periphery of the inner tube 211B. Reference numeral 228 denotes a rebound rubber, and reference numeral 229 denotes a bump rubber.

In the hydraulic shock absorber 200, a sub tank 230 is integrally formed in the vehicle body side attaching member 214, and an air chamber 231 and an oil reservoir chamber 232 which are provided within the sub tank 230 sealed by a cap 230A are separated by a bladder 233. The oil reservoir chamber 232 pressurized by a pressure of the air chamber 231 which is set to a high pressure via an air valve (not shown) provided in the cap 230A communicates with the oil chamber 227 of the damper cylinder 211, and a volumetric capacity (including a volumetric capacity of an oil temperature extension) of the piston rod 212 moving forward and backward with respect to the oil chamber 227 of the damper cylinder 211 is compensated by the oil reservoir chamber 32.

The hydraulic shock absorber 200 is provided with a damping force generating device 240 between the piston side oil chamber 227A and the rod side oil chamber 227B of the damper cylinder 211.

Figure 15:
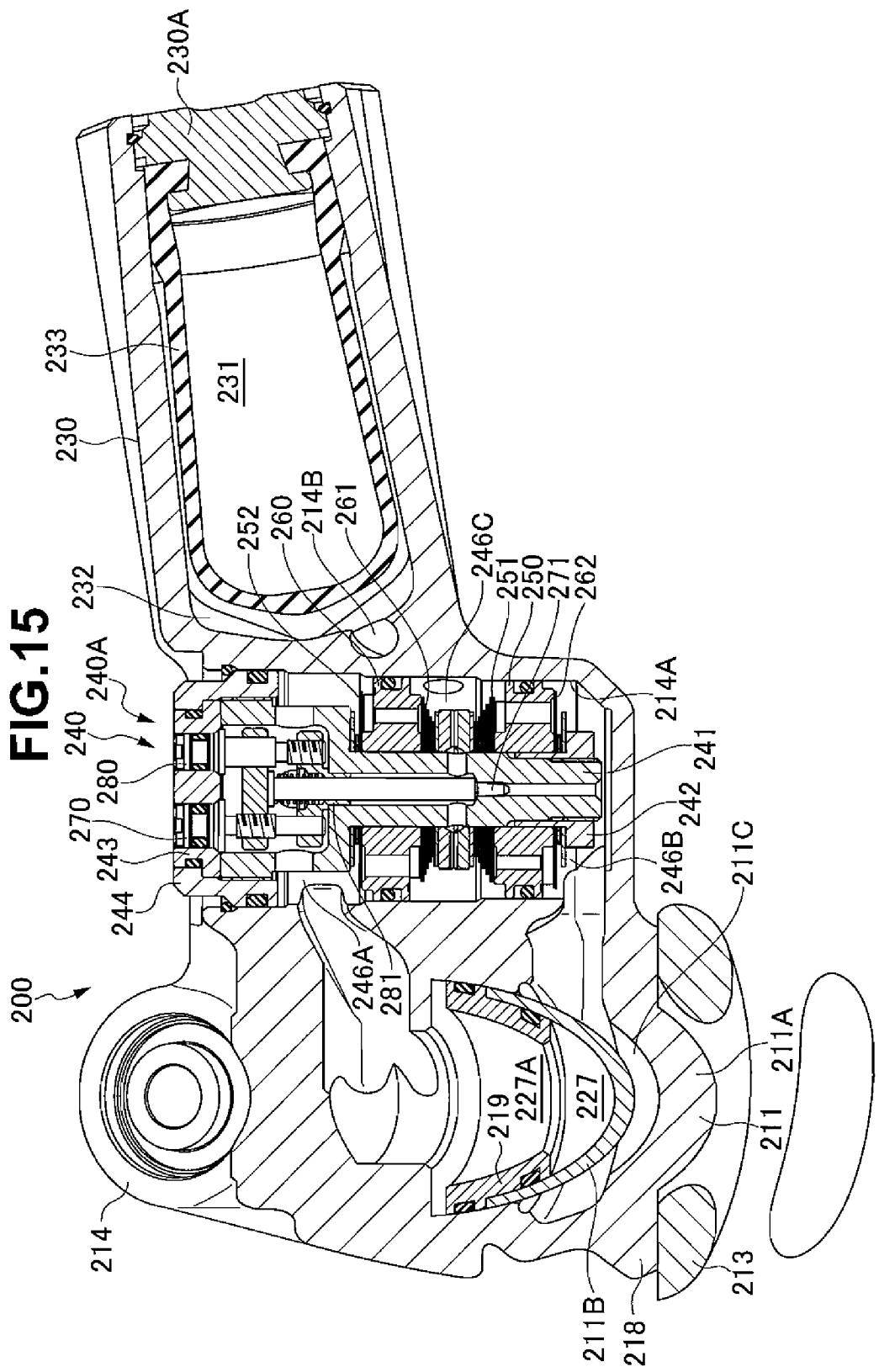
FIG. 15 is a cross sectional view taken along a line XIV-XIV of FIG. 14.
Figure 16:
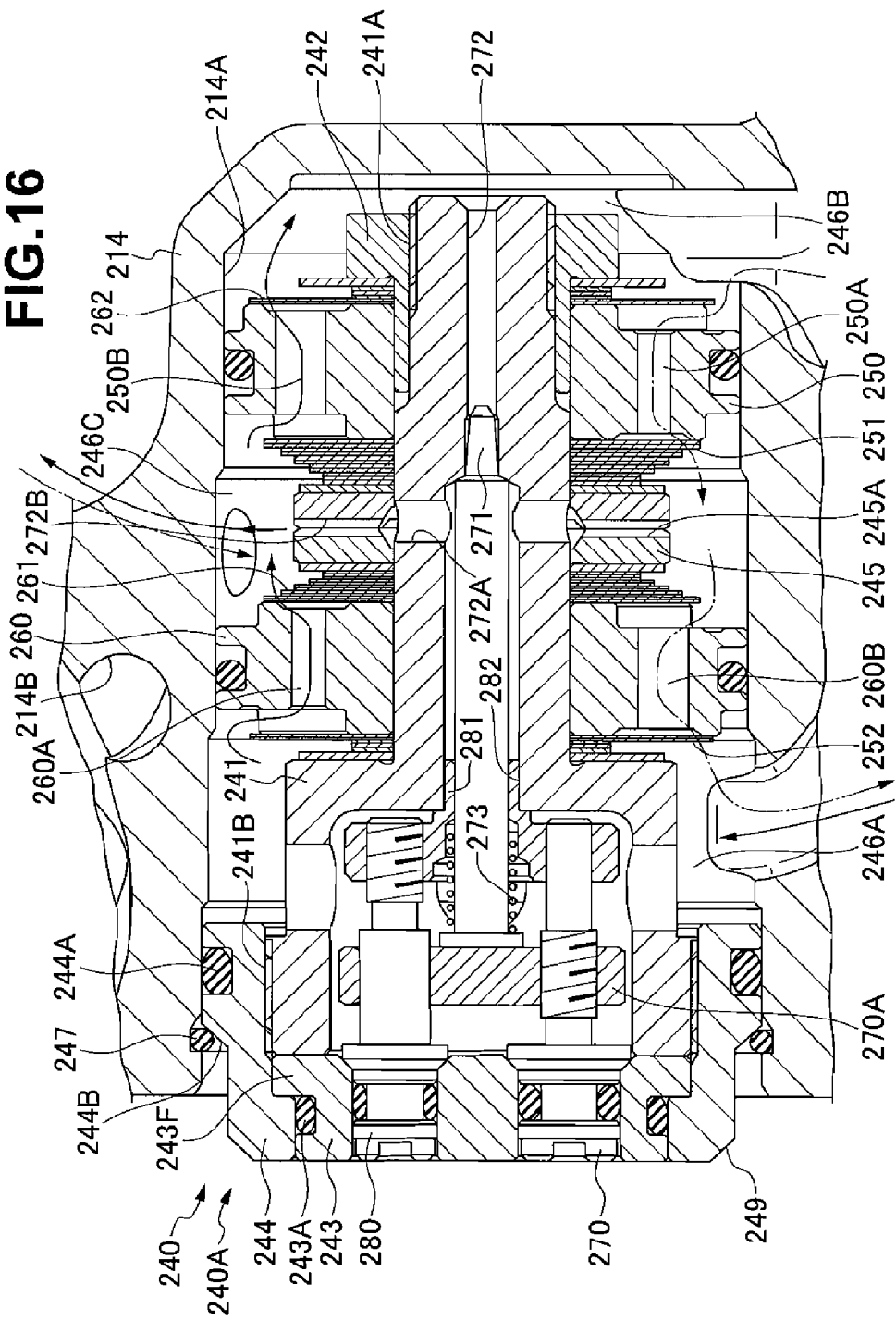
FIG. 16 is a cross sectional view showing a damping force generating device.
Figure 17:
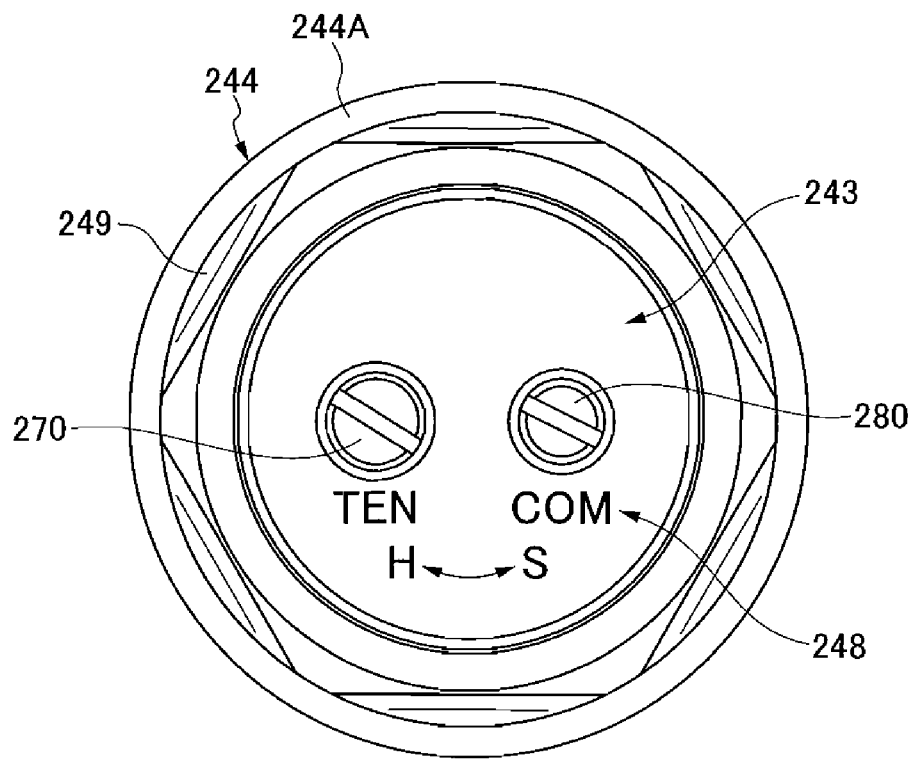
FIG. 17 is a plan view showing an adjuster holder.

The damping force generating device 240 is installed by insertion into a valve accommodating hole 214A provided between the damper cylinder 211 and the sub tank 230 in the vehicle body side attaching member 214, in a sub assembled state in a valve unit 240A shown in FIGS. 15 and 16.

The valve unit 240A of the damping force generating device 240 has a valve piece 241, an inner valve holder 242 screwed to a small diameter portion 241A close to an inner end side of the valve piece 241, an adjuster holder 243 brought into impact contact with an end surface of a large diameter portion 241B close to an outer end side of the valve piece 241 from outside, and a cap 244 fitted in a liquid tight manner to an outer periphery to which an O-ring is loaded in the adjuster holder 243 from outside to be engaged in an axial direction, and screwed to the large diameter portion 241B of the valve piece 241.

The valve unit 240A of the damping force generating device 240 is further provided with two opposed center plates 245 proximate a center along an axial direction of an outer periphery of the small diameter portion 241A of the valve piece 241, is loaded with an extension side laminated disc valve 252, a compression side piston 260 and a compression side damping valve 261, in this order, from a side of a step surface with the large diameter portion 241B in an axial direction in both sides of the center plates 245 in an outer periphery of the small diameter portion 241A of the valve piece 241, and is loaded with a compression side laminated disc valve 262, an extension side piston 250 and an extension side damping valve 251 in this order from a side of an end surface of the inner valve holder 242. A set of the extension side laminated disc valve 252, the compression side piston 260 and the compression side damping valve 261, and a set of the compression side laminated disc valve 262, the extension side piston 250 and the extension side damping valve 251 are arranged to be line symmetrical with respect to the center plates 245, and is pinched and fixed together with the center plates 245 between the step surface of the small diameter portion 241A and the large diameter portion 241B in the valve piece 241, and the end surface of the inner valve holder 242.

The valve unit 240A of the damping force generating device 240 is structured by assembling the adjuster holder 243 and the cap 244 in the large diameter portion 241B of the valve piece 241 described above in the manner described above, and further assembling an extension side adjuster 270 and a compression side adjuster 280, which will be described later, in the adjuster holder 243 to be sub-assembled.

In this case, two center plates 245 are opposed to each other within the valve unit 240A of the damping force generating device 240 form a hole 272A via a plurality of radial grooves 245A provided radially on mating faces of the opposed perforated plates.

The valve unit 240A of the damping force generating device 240 is inserted into the valve accommodating hole 214A from outside, a leading end surface of the inner valve holder 242 opposed to a bottom surface in the axial direction of the valve accommodating hole 214A, and is fitted in a liquid tight manner to an outer periphery to which the O-ring 244A of the cap 244 is loaded to the opening portion of the valve accommodating hole 214A to be fixed as will be described later. At this time, the damping force generating device 240 fixes the outer periphery to which the O-ring is loaded in the extension side piston 250 and the compression side piston 260 to the inner periphery of the valve accommodating hole 214A in a liquid tight manner, forms a space in an opposed side to the extension side piston of the compression side piston 260 in the valve accommodating hole 214A as an extension and compression common flow path 246A communicating with the piston side oil chamber 227A, forms a space in an opposed side to the compression side piston of the extension side piston 250 in the valve accommodating hole 214A as an extension and compression common flow path 246B communicating with the rod side oil chamber 227B via an outside flow path 211C, which will be described later, of the damper cylinder 211, and forms an annular space pinched by the extension side piston 250 and the compression side piston 260 around the center plate 245 in the valve accommodating hole 214A as an extension and compression common flow path 246C communicating with the oil reservoir chamber 232 via a communication path 214B provided in the vehicle body side attaching member 214. Further, the damping force generating device 240 is provided with an extension side flow path 250A which is opened and closed by the extension side damping valve 251, and a compression side flow path 250B which is opened and closed by the compression side laminated disc valve 262, in the extension side piston 250, and is provided with an extension side flow path 260B which is opened and closed by the extension side laminated disc valve 252, and a compression side flow path 260A which is opened and closed by the compression side damping valve 261, in the compression side piston 260. The damping force generating device 240 communicates the piston side oil chamber 227A and the rod side oil chamber 227B via the extension and compression common flow paths 246A, 246B and 246C which are provided in the vehicle body side attaching member 214, the extension side flow path 250A and the compression side flow path 250B which are provided in the extension side piston 250, the extension side flow path 260B and the compression side flow path 260A which are provided in the compression side piston 260, the outside flow path 211C which is provided in an annular gap between the outer tube 211A and the inner tube 211B of the damper cylinder 211, and the hole flow path 211D which is provided in the inner tube 211B (the piston 225 is not provided with a flow path communicating the piston side oil chamber 227A and the rod side oil chamber 227B).

Accordingly, in the hydraulic shock absorber 200, the damping force generating device 240 is provided with the compression side flow path (the extension and compression common flow paths 246A, 246B and 246C, and the compression side flow paths 260A and 250B) circulating the oil in the piston side oil chamber 227A of the damper cylinder 211 from the outside flow path 211C of the damper cylinder 211 toward the rod side oil chamber 227B, in the compression stroke, the compression side damping valve 261 is provided in an upstream side of the compression side flow path (the extension and compression common flow paths 246A, 246B and 246C, and the compression side flow paths 260A and 250B), the compression side laminated disc valve 262 is provided in a downstream side thereof, and an intermediate portion of the compression side damping valve 261 and the compression side laminated disc valve 262 in the compression side flow path (the extension and compression common flow paths 246A, 246B and 246C, and the compression side flow paths 260A and 250B) communicates with the oil reservoir chamber 232 via the extension and compression common flow path 246C and the communication path 214B. The compression side damping valve 261 is constructed by a laminated body of disc valves, and generates the compression side damping force. The compression side laminated disc valve 262 is structured by adding the compression side damping force generating means to the compression side check valve (the compression side damping force may be generated based on a throttle resistance of the compression side flow path 250B provided with the compression side laminated disc valve 262), is constructed by the laminated body of the disc valves, and carries out a compression side damping force generating function as well as a check function allowing only the compression side flow. The generated damping force of the compression side laminated disc valve 262 is smaller than the generated damping force of the compression side damping valve 261, and the compression side damping force generated by the damping force generating device 240 largely depends on the compression side damping valve 261.

Further, the damping force generating device 240 is provided with the extension side flow path (the extension and compression common flow paths 246A, 246B and 246C, and the extension side flow paths 250A and 260B) circulating the oil in the rod side oil chamber 227B of the damper cylinder 211 from the outside flow path 211C of the damper cylinder 211 toward the piston side oil chamber 227A, in the extension stroke, the extension side damping valve 251 is provided in an upstream side of the extension side flow path (the extension and compression common flow paths 246A, 246B and 246C, and the extension side flow paths 250A and 260B), the extension side laminated disc valve 252 is provided in a downstream side thereof, and an intermediate portion of the extension side damping valve 251 and the extension side laminated disc valve 252 in the extension side flow path (the extension and compression common flow paths 246A, 246B and 246C, and the extension side flow paths 250A and 260B) communicates with the oil reservoir chamber 232 via the extension and compression common flow path 246C and the communication path 214B. The extension side damping valve 251 is constructed by a laminated body of the disc valves, and generates the extension side damping force. The extension side laminated disc valve 252 is structured by adding the extension side damping force generating means to the extension side check valve (the extension side damping force may be generated based on a throttle resistance of the extension side flow path 260B provided with the extension side laminated disc valve 252), is constructed by the laminated body of the disc valves, and carries out an extension side damping force generating function as well as a check function allowing only the extension side flow. The generated damping force of the extension side laminated disc valve 252 is smaller than the generated damping force of the extension side damping valve 251, and the extension side damping force generated by the damping force generating device 240 largely depends on the extension side damping valve 251.

The damping force generating device 240 may be provided with an extension side bypass flow path 272 and a compression side bypass flow path 282 which communicate the piston side oil chamber 227A and the rod side oil chamber 227B of the damper cylinder 211 with the oil reservoir chamber 232, bypassing the extension side damping valve 251 and the compression side damping valve 261, in a hollow portion provided on a center axis of the small diameter portion 241A to the large diameter portion 241B of the valve piece 241, as shown in FIG. 16, if necessary. The extension side damping force can be adjusted by regulating an opening area of the extension side bypass flow path 272 by means of an extension side damping force adjusting valve 271 which is externally operated by an extension side adjuster 270 provided in the adjuster holder 243. The extension side bypass flow path 272 is open to the extension and compression common flow path 246C via a hole 272A provided in the valve piece 241 and a hole 272B provided in the center plate 245, as well as being open to the extension and compression common flow path 246A. The compression side damping force can be adjusted by adjusting an opening area of the compression side bypass flow path 282 by means of a compression side damping force adjusting valve 81 which is externally operated by a compression side adjuster 280 provided in the adjuster holder 243. The compression side bypass flow path 282 is open to the extension and compression common flow path 246C via the hole 272A provided in the valve piece 142 and the hole 272B provided in the center plate 245, as well as being open to the extension and compression common flow path 246B. The extension side adjuster 270 and the compression side adjuster 280 are arranged side by side, spaced adjacently to each other in a plan view of the adjuster holder 243.

In this case, the extension side adjuster 270 is pivoted in a liquid tight manner to the adjuster holder 243 via the O-ring to be externally rotatable, the slider 270A is screwed to a male thread portion of the extension side adjuster 270, and the slider 270A moving based on the rotation of the extension side adjuster 270 pushes a rod-like base end portion of the extension side damping force adjusting valve 271, and moves a leading end needle valve of the extension side damping force adjusting valve 271 forward and backward with respect to the opening of the extension side bypass flow path 272. Further, the compression side adjuster 280 is pivoted in a liquid tight manner to the adjuster holder 243 via the O-ring to be externally rotatable, the compression side damping force adjusting valve 281 is loosely inserted around the rod of the extension side damping force adjusting valve 271, the male thread portion of the compression side adjuster 280 is screwed to the flange portion thereof, and the leading end needle valve of the compression side damping force adjusting valve 281 moving based on the rotation of the compression side adjuster 280 is moved forward and backward with respect to the opening of the compression side bypass flow path 282. A compression coil spring 273 is interposed between a bulging base end portion of the extension side damping force adjusting valve 271 and a depressed concave portion provided around the extension side damping force adjusting valve 271 of the compression side damping force adjusting valve 281 in such a manner as to always bring the base end portion of the extension side damping force adjusting valve 271 into pressure contact with the slider 270A. An intermediate shaft portion of the compression side adjuster 280 is inserted into the slider 270A of the extension side adjuster 270 so as to prevent the slider 270A from rotating. The leading end shaft portion of the extension side adjuster 270 is inserted into the flange portion of the compression side damping force adjusting valve 281 so as to prevent the compression side damping force adjusting valve 281 from rotating.

Accordingly, the hydraulic shock absorber 200 carries out a damping action as follows.

(Compression Stroke) (Flow Shown by Solid Line Arrows in FIG. 16)

The oil in the piston side oil chamber 227A increases its pressure and pushes open the compression side damping valve 261 in the compression side flow path 260A of the compression side piston 260 of the damping force generating device 240 to generate the compression side damping force. The oil flowing out through the compression side damping valve 261 to the extension and compression common flow path 246C is separated into two flows in the extension and compression common flow path 246C, one flow of the oil flows out to the rod side oil chamber 227B through the compression side check valve 262 in the compression side flow path 250B of the extension side piston 250 through the outside flow path 211C of the cylinder 211, and the other flow of the oil is discharged to the oil reservoir chamber 232. The other flow of the oil discharged to the oil reservoir chamber 232 compensates the amount of oil corresponding to the volumetric capacity of the forward movement of the piston rod 212.

(Extension Stroke) (Flow Shown by Dashed Dotted Line Arrows in FIG. 16)

The oil in the rod side oil chamber 227B increases its pressure and pushes open the extension side damping valve 251 in the extension side flow path 250A of the extension side piston 250 of the damping force generating device 240 through the outside flow path 211 of the cylinder 211 so as to generate the extension side damping force. The oil flowing out through the extension side damping valve 251 to the extension and compression common flow path 246C conflows with the oil replenished from the oil reservoir chamber 232 and thereafter flows out to the piston side oil chamber 227A through the extension side laminated disc valve 252 in the extension side flow path 260B of the compression side piston 260. The oil replenished from the oil reservoir chamber 232 compensates the amount of oil corresponding to the volumetric capacity of the backward movement of the piston rod 212.

Therefore, in accordance with the present embodiment, the following effects can be obtained.

(a) In the hydraulic shock absorber 200, the damping force generating device 240 is provided between the piston side oil chamber 227A of the damper cylinder 211, and the rod side oil chamber 227B, the damping force generating device 240 is provided with the compression side flow path (the extension and compression common flow paths 246A, 246B and 246C, and the compression side flow paths 260A and 250B) circulating the oil in the piston side oil chamber 227A of the damper cylinder 211 from the outside flow path 211C of the damper cylinder 211 toward the rod side oil chamber 227B in the compression stroke, the compression side damping valve 261 is provided in the upstream side of the compression side flow path (the extension and compression common flow paths 246A, 246B and 246C, and the compression side flow path 260A and 250B), the compression side laminated disc valve 262 constructed by adding the compression side damping force generating means to the compression side check valve is provided in the downstream side thereof, and the intermediate portion of the compression side damping valve 261 and the compression side laminated disc valve 262 in the compression side flow path (the extension and compression common flow paths 246A, 246B and 246C, and the compression side flow paths 260A and 250B) communicates with the oil reservoir chamber 232. Further, the damping force generating device 240 is provided with the extension side flow path (the extension and compression common flow paths 246A, 246B and 246C, and the extension side flow paths 250A and 260B) circulating the oil in the rod side oil chamber 227B of the damper cylinder 211 from the outside flow path 211C of the damper cylinder 211 toward the piston side oil chamber 227A in the extension stroke, the extension side damping valve 251 is provided in the upstream side of the extension side flow path (the extension and compression common flow paths 246A, 246B and 246C, and the extension side flow path 250A and 260B), the extension side laminated disc valve 252 constructed by adding the extension side damping force generating means to the extension side check valve is provided in the downstream side thereof, and the intermediate portion of the extension side damping valve 251 and the extension side laminated disc valve 252 in the extension side flow path (the extension and compression common flow paths 246A, 246B and 246C, and the extension side flow paths 250A and 260B) communicates with the oil reservoir chamber 232.

In the compression stroke, the oil with increased pressure in the piston side oil chamber 227A passes through the compression side damping valve 261 in the upstream side of the compression side flow path (the extension and compression common flow paths 246A, 246B and 246C, and the compression side flow paths 260A and 250B) of the damping force generating device 40 so as to generate the compression side damping force. One flow of the oil flowing out through the compression side damping valve 261 flows into the rod side oil chamber 227B through the compression side laminated disc valve 262 and the outside flow path 211C of the damper cylinder 211. Further, another flow of the oil flowing out through the compression side damping valve 261 in an amount corresponding to the volumetric capacity of the forward movement of the piston rod 212 flows into the oil reservoir chamber 232. At this time, the pressure in the rod side oil chamber 227B largely depends only on the pressure in the air chamber 231 pressurizing the oil reservoir chamber 232, and the flow path resistance of the compression side laminated disc valve 262 in the downstream side of the compression side damping valve 261, and does not fluctuate depending on setting of the flow path resistance of the compression side damping valve 261. Accordingly, it is possible to avoid a pause in the damping force when reversing to the extension stroke.

In the extension stroke, the oil with increased pressure in the rod side oil chamber 227B passes through the extension side damping valve 251 in the upstream side of the extension side flow path (the extension and compression common flow paths 246A, 246B and 246C, and the extension side flow paths 250A and 260B) of the damping force generating device 240 from the outside flow path 211 of the damper cylinder 211 so as to generate the extension side damping force. The oil flowing out through the extension side damping valve 251 conflows with the oil in an amount corresponding to the volumetric capacity of the backward movement of the piston rod 212 replenished from the oil reservoir chamber 232, and thereafter flows into the piston side oil chamber 227A through the extension side laminated disc valve 252.

In this case, it is possible to set the pressure in the rod side oil chamber 227B to a large positive pressure so as to improve the damping response when reversing to the extension stroke, by setting the pressure in the air chamber 231 pressurizing the oil reservoir chamber 232 to a high pressure.

(b) The damping force generating device 240 in the above (a) is structured such that the compression side damping force generating means is added to the compression side check valve provided in the compression side flow path 250B, and the compression side check valve is set to the compression side laminated disc valve 262. At this time, in the compression stroke, while one flow of the oil flowing out through the compression side damping valve 261 in the upstream side passes through the compression side laminated disc valve 262 and the outside flow path 211C of the damper cylinder 211 so as to flow into the rod side oil chamber 227B, the compression side laminated disc valve 262 carries out the compression side damping force generating function as well as the check function. The compression side laminated disc valve 262 generates the damping force $\Delta F$ depending on the piston speed, and the pressure Pr of the rod side oil chamber 227B becomes a value obtained by subtracting the value $\Delta F$ from the pressure Pa of the air chamber 231 pressurizing the oil reservoir chamber 232, namely, a value controlled depending on the piston speed.

The pressure Pr of the rod side oil chamber 227B being controlled in the compression stroke depending on the piston speed as described above means that it is possible to control a rise characteristic of the damping force when reversing to the extension stroke depending on the piston speed. When the piston speed is high, the value $\Delta F$ becomes large by the throttle of the compression side laminated disc valve 262, and the value Pr becomes small. Accordingly, the rise of the damping force when reversing to the extension stroke becomes gentle and the ride quality is improved. When the piston speed is low, the value $\Delta F$ generated by the throttling the compression side laminated disc valve 262 becomes small, and the value Pr becomes large. Accordingly, the rise of the damping force when reversing to the extension stroke becomes sharp, and it is possible to suppress the wobbliness of the vehicle body so as to improve the driving stability.

At this time, while the total amount of the compression side damping force becomes the total of the damping force of the compression side damping valve 261 and the damping force of the compression side laminated disc valve 262, in the normal setting, the damping force of the compression side damping valve 261 is made larger. The total amount of the compression side damping force largely depends on the damping force of the compression side damping valve 261.

(c) The damping force generating device 240 in the above (a) is structured such that the extension side damping force generating means is added to the extension side check valve provided in the extension side flow path 260B, and the extension side check valve is set to the extension side laminated disc valve 252. At this time, in the extension stroke, while one flow of the oil flowing out through the extension side damping valve 251 in the upstream side flows into the piston side oil chamber 227A through the extension side laminated disc valve 252 and the outside flow path 211C of the damper cylinder 211, the extension side laminated disc valve 252 carries out the extension side damping force generating function as well as the check function. The extension side laminated disc valve 252 generates the damping force $\Delta F$ depending on the piston speed, and the pressure Pp of the piston side oil chamber 227A becomes the value obtained by subtracting the value $\Delta F$ from the pressure Pa of the air chamber 231 pressurizing the oil reservoir chamber 232, namely, the value controlled depending on the piston speed.

The pressure Pp of the piston side oil chamber 227A being controlled depending on the piston speed in the extension stroke as described above means that it is possible to control the rise characteristic of the damping force when reversing to the compression stroke depending on the piston speed. When the piston speed is high, the value $\Delta F$ becomes large by the throttle of the extension side laminated disc valve 252, and the value Pp becomes small. Accordingly, the rise of the damping force when reversing to the compression stroke becomes gentle so as to improve the ride quality. When the piston speed is low, the value $\Delta F$ generated by the throttle of the extension side laminated disc valve 252 becomes small, and the value Pp becomes large. Accordingly, the rise of the damping force when reversing to the compression stroke becomes sharp so as to suppress the wobbliness of the vehicle body and improve the driving stability.

At this time, while the total amount of the extension side damping force becomes the total of the damping force of the extension side damping valve 251, and the damping force of the extension side laminated disc valve 252, the damping force of the extension side damping valve 251 is made larger in the normal setting. The total amount of the extension side damping force largely depends on the damping force of the extension side damping valve 251.

(d) The damping force generating device 240 in the above (a) to (c) has the valve piece 241 fixed to the damper cylinder 211, is provided with the center plate 245 in the center along the axial direction of the outer periphery of the valve piece 241, is provided with the extension side damping valve 251 and the compression side laminated disc valve 262 in one side in the axial direction having the center plate 245 in the outer periphery of the valve piece 241 therebetween, is provided with the compression side damping valve 261 and the extension side laminated disc valve 252 in the other side, and arranges the set of the extension side damping valve 251 and the compression side laminated disc valve 262 and the set of the compression side damping valve 261 and the extension side laminated disc valve 252 to be line symmetrical with respect to the center plate 245. Accordingly, it is possible to construct both the flow path of the oil of the above (a) flowing out to the rod side oil chamber 227B and the oil reservoir chamber 232 from the piston side oil chamber 227A through the damping force generating device 240 in the compression stroke, and the flow path of the oil of the above (a) flowing out to the piston side oil chamber 227A from the rod side oil chamber 227B and the oil reservoir chamber 232 through the damping force generating device 240 in the extension stroke, so as to have a short flow path length and a small flow path resistance, thereby making the flows of the oils smooth.

(e) The damping force generating device 240 of the above (d) is provided with the bypass flow paths 272 and 282 communicating the piston side oil chamber 227A of the damper cylinder 211 with the rod side oil chamber 227B and the oil reservoir chamber 232, bypassing the extension side damping valve 251 and the compression side damping valve 261, in the hollow portion provided on the center axis of the valve piece 241, and is provided with the damping force adjusting valves 271 and 281 which are externally operated, in the bypass flow paths 272 and 282. Accordingly, it is possible to adjust the magnitudes of the compression side damping force and the extension side damping force by using the damping force generating device 240.

Accordingly, the hydraulic shock absorber 200 has the rotation operating structure of the adjuster holder 43 of the damping force generating device 240 as described above.

The hydraulic shock absorber 200 is structured, as described above, such that the valve unit 240A of the damping force generating device 240 is assembled in the valve accommodating hole 214A provided in the vehicle body side attaching member 214 provided in the damper cylinder 211, and the adjuster holder 243 of the damping force generating device 240 is provided with the extension side adjuster 270 and the compression side adjuster 280 which can be operated externally, as described above. In the valve unit 240A, the adjuster holder 243 is fitted to the cap 244, the adjuster holder 243 is fitted in a liquid tight manner to the inner periphery of the cap 244 via the O-ring 243A loaded to the outer peripheral groove, an annular collar portion 243F provided in an outer periphery of an inner end portion of the adjuster holder 243 is pinched and fixed to an annular protrusion portion in an inner periphery of an outer end portion of the cap 244, and an end surface of a large diameter portion 241B of the valve piece 241 with which the cap 244 is engaged so as to pull. The cap 244 constructing the valve unit 240A is fitted to an inner periphery of the valve accommodating hole 214A via an O-ring 244A loaded to an outer peripheral groove of an inner end side large diameter portion. Further, the cap 244 is prevented from coming off from the valve accommodating hole 214A by bringing a taper surface 244B provided in an outer end side small diameter portion in an outer periphery of the cap 244 fitted to the valve accommodating hole 214A into contact with a stop ring 247 locked and attached to an annular groove provided in an inner periphery of an opening end side of the valve accommodating hole 214A. The hydraulic pressure of the oil chamber 227 of the damper cylinder 211 presses and holds the taper surface 244B of the cap 244 to the stop ring 247 of the valve accommodating hole 214A.

The hydraulic shock absorber 200 can rotationally operate the cap 244 against a friction force which the O-ring 244A generates with respect to the inner periphery of the valve accommodating hole 214A, and a friction force which the taper surface 244B generates with respect to the stop ring 247, in an assembled state in which the damping force generating device 240 assembles the valve unit 240A in the valve accommodating hole 14A as described above, and can further rotationally operate within the valve accommodating hole 214A of the damper cylinder 211 together with the adjuster holder 243 and the cap 244 (all of the valve unit 240A).

At this time, the adjuster holder 243 is provided with two extension side adjusters 270 and compression side adjusters 280, and these adjusters 270 and 280 are arranged side by side with each other in a plan view (FIG. 17) of the adjuster holder 243. Further, the adjuster holder 243 is provided with a display portion 248 in which letters TEN indicating the extension side are printed in the periphery of the extension side adjuster 270, and letters COM indicating the compression side are printed in the periphery of the compression side adjuster 280, in a surface thereof.

Further, the cap 244 is provided with a rotation operating portion 249 constructed by a polygonal outer peripheral surface in an outer periphery of an outer end portion of the outer end side small diameter portion thereof. The rotation operating portion 249 can be constructed by a deformed outer peripheral surface, a hole, a groove, a knurled portion or the like provided in the cap 244. A user grips the rotation operating portion 249 by a tool, a finger or the like so as to rotationally operate the cap 244 and the adjuster holder 243, in the assembled state described above of the damping force generating device 240, and can set an attaching direction of the adjuster holder 243 to an optional direction. In this case, the cap 244 and the adjuster holder 243 restrains an unexpected rotation caused by the vehicle body vibration or the like based on the friction force of the O-ring 244A described above or the like. The restraining means of the cap 244 and the adjuster holder 243 can be achieved by adding a stop screw or the like.

In this case, the damping force adjuster provided in the adjuster holder 243 which can be rotationally operated is not limited to the structure moving forward and backward the needle valves of the extension side damping force adjusting valve 271 and the compression side damping force adjusting valve 281 such as the extension side adjuster 270 and the compression side adjuster 280, but may be a structure which can adjust a spring load of a spring setting a valve opening pressure of the extension side damping valve 251 or the compression side damping valve 261.

Therefore, in accordance with the present embodiment, the following effects can be obtained.

(a) In the state in which the damping force generating device 240 is assembled, the adjuster holder 243 can be rotationally operated with respect to the damper cylinder 211. Accordingly, it is possible to freely set the attaching direction of the adjuster holder 243 with respect to the damper cylinder 211 by rotationally operating the adjuster holder 243 intentionally with respect to the damper cylinder 211 at a necessary degree (an unexpected rotation being restrained). Accordingly, it is possible to appropriately make out the display portion such as the letter or the like attached by inscribing around the damping force adjusters 270 and 280 on the surface of the adjuster holder 243, at the same time of arranging an outer appearance.

(b) In the case that the adjuster holder 243 is provided with a plurality of damping force adjusters 270 and 280, it is possible to appropriately make out the display portion such as the letter or the like attached to each of the damping force adjusters 270 and 280 on the surface of the adjuster holder 243.

(c) In the case that a plurality of damping force adjusters 270 and 280 are arranged side by side spaced from each other in a plan view of the adjuster holder 243, it is possible to easily achieve an appropriate arrangement of each of the damping force adjusters 270 and 280 with respect to the user, and it is possible to improve a usability of the damping force adjusters 270 and 280.

(d) In the adjuster holder 243 provided with the extension side adjuster 270 and the compression side adjuster 280, the above (a) to (c) described above can be achieved.

(e) When the adjuster holder 243 is fitted to the cap 244, and the cap 244 is fitted to the accommodation hole 214A provided in the damper cylinder 211 and is prevented from coming off by the step ring 247, it is possible to rotationally operate the adjuster holder 243 together with the cap 244 with respect to the damper cylinder 211.

(f) In the above (e), the adjuster holder 243 and the cap 244 can rotationally operate securely by using the rotation operating portion 249 provided in the cap 244.

Further, the hydraulic shock absorber 200 can accommodate the inner tube 211B and the rod guide 221 with no play in the axial direction inside the outer tube 211A of the damper cylinder 211, as will be described later.

The hydraulic shock absorber 200 is structured, as described above, such that the inner tube 211B is inserted into the outer tube 211A formed by the damper cylinder 11, the large outer diameter portion 221A of the rod guide 221 is fitted to the lower end side inner periphery of the outer tube 211A, the lower end inner periphery of the inner tube 211B is fitted to the small outer diameter portion 221B of the rod guide 221, and the upper end outer periphery of the inner tube 211B is fitted to the upper end inner periphery of the outer tube 211A.

In this case, in the hydraulic shock absorber in accordance with the present embodiment, the collar 219 described above is attached in a liquid tight manner to the upper end inner periphery of the inner tube 211B, and the upper end outer periphery of the inner tube 211B is fitted in a liquid tight manner to the upper end inner periphery of the outer tube 211A together with the outer periphery of the collar 219.

The hydraulic shock absorber 200 is structured such that the stop ring 290 preventing the rod guide 221 from coming off is locked and attached to the lower end inner periphery of the outer tube 211A, and the lower end of the inner tube 211B is fixed to the rod guide 221. The stop ring 290 is locked and attached to an annular groove provided in an inner periphery closer to an outer field than the position to which the rod guide 221 is inserted and attached, in the lower end inner periphery of the outer tube 211A. The lower end of the inner tube 211B is fixed via press-fitting in its inner periphery to the small outer diameter portion 221B of the rod guide 21 (may be caulked by a punch or a fastened by a screw). In this case, the upper end outer periphery of the inner tube 211B is fitted to the upper end inner periphery of the outer tube 211A relatively movable in the axial direction with respect to the upper end inner periphery of the outer tube 211A.

Therefore, in accordance with the present embodiment, the following effects can be obtained.

The stop ring 290 preventing the rod guide 221 from coming off is locked and attached to one end inner periphery of the outer tube 211A of the damper cylinder 211, and one end of the inner tube 211B is fixed to the rod guide 221. A space for a locking and attaching work is required between the rod guide 221 and the stop ring 290, when locking and attaching the stop ring 290. However, after locking and attaching the stop ring 290, the rod guide 221 is pressed to the stop ring 290 by receiving the charged hydraulic pressure of the damper cylinder 211, and an axial play is prevented when using.

On the other hand, the inner tube 211B fixed to the rod guide 221 will not generate axial play (the inner tube 211B interposes an axial gap with respect to the outer tube 211A in an opposite side end to the side in which it is fixed to the rod guide 221).

Accordingly, it is possible to accommodate the rod guide 221 and the inner tube 211B inside the outer tube 211A of the damper cylinder 211 without any play in the axial direction, and it is possible to immediately generate the damping force in an early stage of both the extension and compression strokes without any pause.

Further, the come-off prevention generated by the stop ring 290 requires a low cost, the assembled rod guide 221 can be easily attached and detached by detaching the stop ring 290, and a maintainability and an overhaul characteristic of the parts inserted into the outer tube 211A are good. Further, the existence of the space for the locking and attaching work which is prepared between the rod guide 221 and the stop ring 290 excludes a possibility that the rod guide 221 applies the load in the axial direction to the inner tube 211B.

Embodiment 5

FIGS. 18 to 23B

Figure 18:
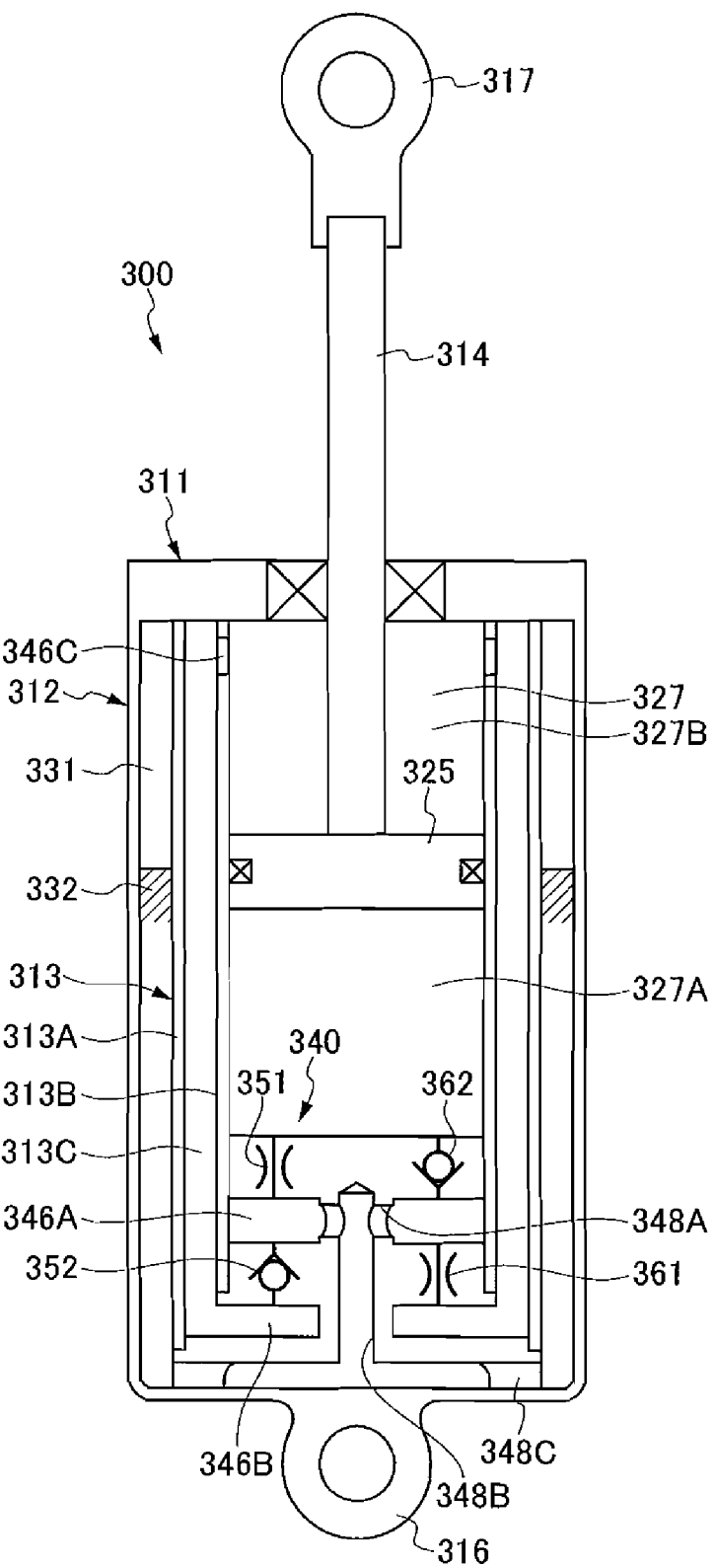
FIG. 18 is a schematic cross sectional view showing a basic structure of a hydraulic shock absorber in accordance with an Embodiment 5.
Figure 19:
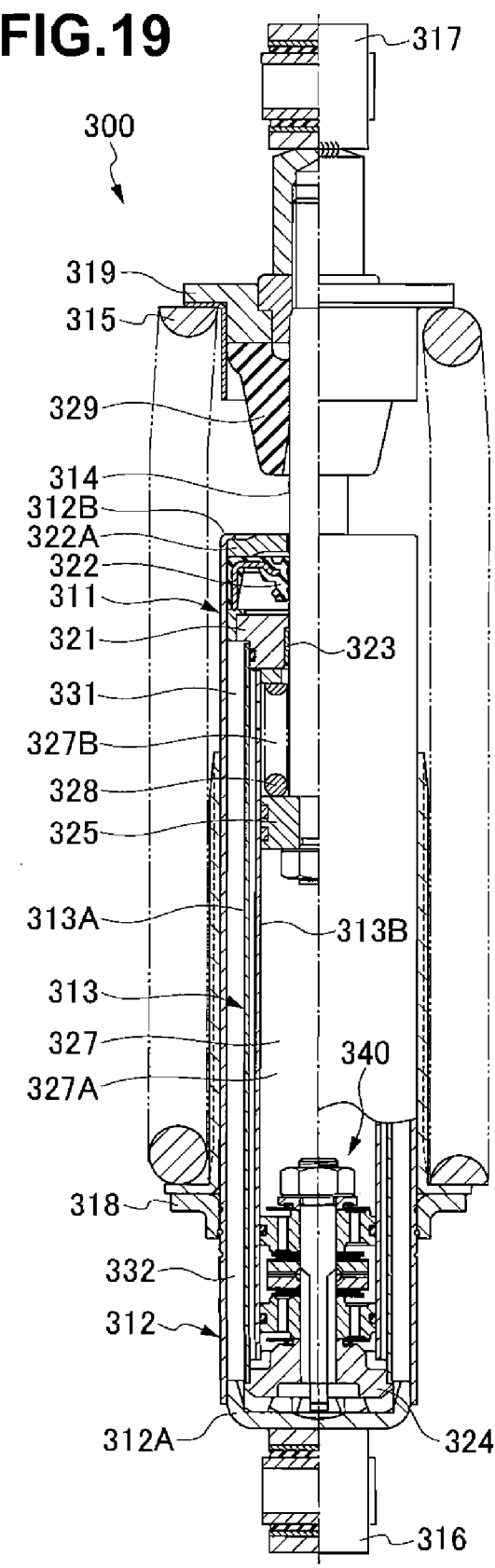
FIG. 19 is a cross sectional view showing the hydraulic shock absorber in accordance with the Embodiment 5.
Figure 20:
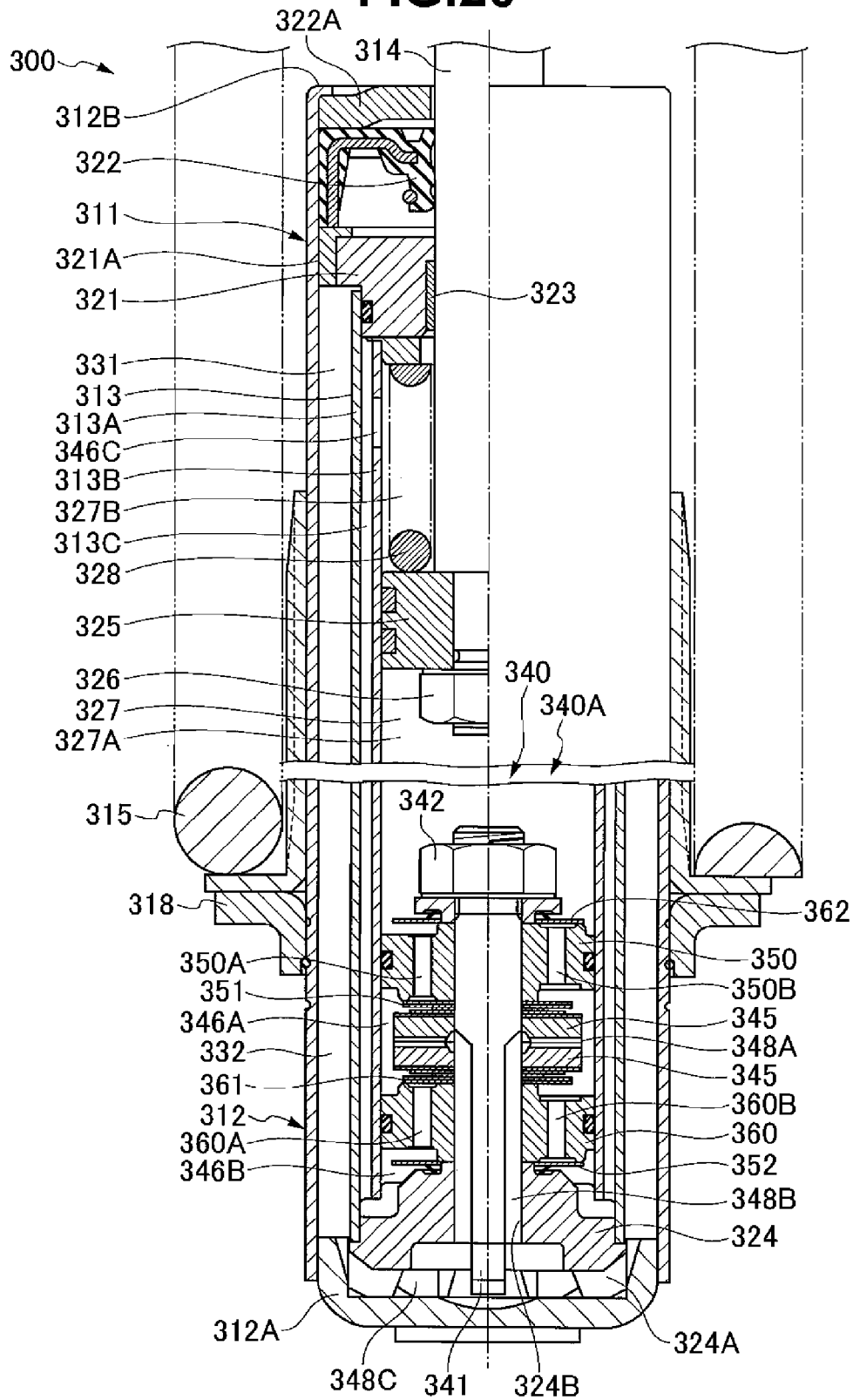
FIG. 20 is a cross sectional view showing a damper case.

A hydraulic shock absorber 300 is structured, as shown in FIGS. 18 to 20, such that a damper case 311 attached to the axial side has a damper tube 312, and a damper cylinder 313 is inserted and fitted into the damper tube 312. Further, the hydraulic shock absorber 300 is structured such that a piston rod 314 attached to the vehicle body side is slidably inserted into the center portion of the damper tube 312 of the damper case 311 and the cylinder 313, and a suspension spring 315 is interposed between the damper case 311 and an outer portion of the piston rod 314.

The damper case 311 is provided with an axis side attaching member 316 in an outer surface center portion of a bottom cap 312A of the damper tube 312, and the piston rod 314 is provided with a vehicle body side attaching member 317. A spring receiver 318 is provided in an outer peripheral portion of the damper tube 312 in the damper case 311, and a spring receiver 319 is provided in an outer peripheral portion of the vehicle body side attaching member 317 in the piston rod 314. The suspension spring 315 is interposed between the spring receiver 318 and the spring receiver 319, and absorbs an impact force that a vehicle receives from a road surface, based on a spring force of the suspension spring 315.

The damper tube 312 of the damper case 311 is provided with a rod guide 321 through which the piston rod 314 passes, in an opening portion thereof. The rod guide 321 is structured such that a head portion 321A is inserted and attached in a liquid tight manner to the damper tube 312, and the piston rod 314 is slidably inserted in a liquid tight manner into an inner diameter portion provided with an oil seal 322 and a bush 323.

The hydraulic shock absorber 300 is structured such that the damper case 311 inserts and fits the cylinder 313 into the damper tube 312, the cylinder 313 is constructed by an outer tube 313A and an inner tube 313B, and the damper case 311 fits a lower end inner periphery of the damper tube 312 to an outer periphery of the bottom cap 312A so as to fix in accordance with a welding or the like. Leg portions 324A provided at a plurality of positions in a lower end of an outer periphery of the bottom piece 324 are arranged centered on a cup-shaped inner bottom surface of the bottom cap 312A, and respective lower end inner peripheries of an outer tube 313A and an inner tube 313B of the cylinder 313 are fixed by press-fitting respectively to a large outer diameter portion and a small outer diameter portion which are provided on the leg portion 324A in an outer periphery of the bottom piece 324. On the other hand, upper end inner peripheries of the outer tube 313A and the inner tube 313B of the cylinder 313 are respectively fixed by press-fitting or the like to a large outer diameter portion and a small outer diameter portion which are provided below the head portion 321A of the rod guide 321. The upper end inner periphery of the outer tube 313A is inserted and attached in a liquid tight manner to an O-ring which is loaded to the large outer diameter portion of the rod guide 321. Further, the damper tube 312 is inserted and attached to the head portion 321A of the rod guide 321, protrudes upward from the oil seal 322 on the head portion 321A and a washer 322A provided in the upper surface of the oil seal 322, and forms a protrusion end thereof as a caulking portion 312B. The damper tube 312 is structured to pinch and fix the outer tube 313A and the inner tube 313B of the cylinder 313 between the bottom cap 312A and the caulking portion 312B via the rod guide 321, the oil seal 322, the washer 322A and the bottom piece 324.

The hydraulic shock absorber 300 is constructed as a triple-tube in which the damper tube 312, the outer tube 313A of the cylinder 313 and the inner tube 313B thereof are coaxially arranged as a whole of the damper case 311, in accordance with the above. Further, an oil chamber 327 constructed by a piston side oil chamber 327A and a rod side oil chamber 327B is formed inside the inner tube 313B, an outside flow path 313C communicating the piston side oil chamber 327A and the rod side oil chamber 327B is formed by an annular gap between the outer tube 313A and the inner tube 313B, and an annular gap between the damper tube 312 and the outer tube 313A is formed as an air chamber 331 and an oil reservoir chamber 332.

In other words, the hydraulic shock absorber 300 is structured such that when the piston rod 314 is inserted into the center portion of the damper tube 312 of the damper case 311 and the cylinder 313, a piston 325 inserted and attached to the leading end portion of the piston rod 314 is fixed by a nut 326, and the oil chamber 327 of the cylinder 313 is comparted into the piston side oil chamber 327A and the rod side oil chamber 327B by the piston 325 which is slidably inserted into an inner periphery of the inner tube 313B. Reference numeral 328 denotes a rebound spring, and reference numeral 329 denotes a bump rubber.

Further, the hydraulic shock absorber 300 is provided with the air chamber 331 and the oil reservoir chamber 332 respectively in upper and lower sides of an annular gap between the damper tube 312 and the outer tube 313A, is provided with the oil reservoir chamber 332 in such a manner as to be communicated with the oil chamber 327 of the cylinder 313, and compensates a volumetric capacity (including a volumetric capacity of an oil temperature extension amount) of the piston rod 314 moving forward and backward with respect to the oil chamber 327 of the cylinder 313 by the oil reservoir chamber 332.

The hydraulic shock absorber 300 is provided with a damping force generating device 340 between the piston side oil chamber 327A and the rod side oil chamber 327B of the cylinder 313.

The damping force generating device 340 is installed by insertion into a lower end inner periphery of the inner tube 313B of the cylinder 313, in a state of a valve unit 340A which is sub-assembled in a top surface in an opposite side to the leg portion 324A of the bottom piece 324.

The valve unit 340A of the damping force generating device 340 has a bolt-shaped valve piece 341 (FIGS. 22A to 22C) which is inserted into a hole 324B on the center axis of the bottom piece 324 communicating with a side of a lower surface of the bottom piece 324. The valve piece 341 is structured such that a tabular head portion 341A provided in a lower end portion is locked around the hole 324B around the lower surface of the bottom piece 324, and a nut 342 is screwed to a rod-like thread portion 341A. Further, a half portion in a longitudinal direction close to the head portion 341A in an axial direction of the valve piece 341 is formed as a flat plate portion 341C in which both faces are chipped off, two opposed center plates 345 (FIGS. 23A and 23B) are provided in an outer periphery of the flat plate portion 341C, a compression side check valve 352, an extension side piston 360 and an extension side damping valve 361 are loaded in this order from a side of the bottom piece 324 in an axial direction in both sides of the center plate 345 in the outer periphery of the valve piece 341, and an extension side check valve 362, a compression side piston 350 and a compression side damping valve 351 are loaded in this order from the side of the nut 342. A set of the compression side check valve 352, the extension side piston 360 and the extension side damping valve 361, and a set of the extension side check valve 362, the compression side piston 350 and the compression side damping valve 351 are arranged in a line symmetrical manner with respect to the center plate 345, and are pinched and fixed together with the center plate 345, between the upper surface of the bottom piece 324 to which the head portion 341A of the valve piece 341 is locked, and the nut 342 which is screwed to the thread portion 341B of the valve piece 341.

The valve unit 340A of the damping force generating device 340 is inserted into the inner tube 313B of the cylinder 313, the outer periphery of the compression side piston 350 and the extension side piston 360 is fixed in a liquid tight manner to the inner periphery of the inner tube 313B, a space in an opposite side to the extension side piston of the compression side piston 350 inside the inner tube 313B is formed as a piston side oil chamber 327A, and a space in an opposite side to the compression side piston of the extension side piston 360 inside the inner tube 313B is formed as an extension and compression common flow path 346B communicating with the rod side oil chamber 327B via the outside flow path 313C between the outer tube 313A and the inner tube 313B of the cylinder 313. In this case, a groove flow path coming to a part of the extension and compression common flow path 346B is formed as a notch in the periphery of the small outer diameter portion to which the inner tube 313B is fixed in the bottom piece 324. An extension and compression common flow path 346C communicates the rod side oil chamber 327B with the outside flow path 313C in an upper end side of the inner tube 313B. An annular space sandwiched by the compression side piston 350 and the extension side piston 360 in the periphery of the center plate 345 inside the inner tube 313B is formed as an extension and compression common flow path 346A. The extension and compression common flow path 346A has two opposed center plates 345 in communication with a hole-shaped extension and compression common flow path 348A (a communication path) formed by opposing a plurality of radial grooves 345A (FIGS. 23A and 23B) provided radially in the mating faces of the perforated plates to each other. The extension and compression common flow path 348A formed by the center plate 345 communicates with an extension and compression common flow path 348B (a communication path) which the flat plate portion 341C of the valve piece 341 forms with respect to the respective center holes of the center plate 345, the extension side piston 360 and the bottom piece 324. The extension and compression common flow path 348B communicates with an oil reservoir chamber 332 between the damper tube 312 and the outer tube 313A of the cylinder 313, via an extension and compression common flow path 348C (a communication path) which a lower surface of the bottom piece 324 forms with respect to the bottom cap 312A.

Further, the damping force generating device 340 is provided in the compression side piston 350 with a compression side flow path 350A which is opened and closed by the compression side damping valve 351, and an extension side flow path 350B which is opened and closed by the extension side check valve 362, and is provided in the extension side piston 360 with a compression side flow path 360B which is opened and closed by the compression side check valve 352, and an extension side flow path 360A which is opened and closed by the extension side damping valve 361. The damping force generating device 340 communicates the piston side oil chamber 327A and the rod side oil chamber 327B of the cylinder 313 via the extension and compression common flow paths 346A and 346B, the compression side flow path 350A and the extension side flow path 350B which are provided in the compression side piston 350, the compression side flow path 360B and the extension side flow path 360A which are provided in the extension side piston 360, and the outside flow path 313C which is provided in the annular gap between the outer tube 313A and the inner tube 313B of the cylinder 313 (the piston 325 is not provided with any flow path communicating the piston side oil chamber 327A with the rod side oil chamber 327B).

Accordingly, in the hydraulic shock absorber 300, the damping force generating device 340 is provided with the compression side flow path (the extension and compression common flow paths 346A and 346B, and the compression side flow paths 350A and 360B) circulating the oil in the piston side oil chamber 327A of the cylinder 313 from the outside flow path 313C of the cylinder 313 toward the rod side oil chamber 327B in the compression stroke, the compression side damping valve 351 is provided in an upstream side of the compression side flow path (the extension and compression common flow paths 346A and 346B), the compression side flow paths 350A and 360B), the compression side check valve 352 is provided in a downstream side thereof, and an intermediate portion of the compression side damping valve 351 and the compression side check valve 352 in the compression side flow path (the extension and compression common flow paths 346A and 346B, and the compression side flow paths 350A and 360B) communicates with the oil reservoir chamber 332 via the extension and compression common flow paths 346A, and 348A to 348C.

Further, the damping force generating device 340 is provided with the extension side flow path (the extension and compression common flow paths 346A and 346B, and the extension side flow paths 350B and 360A) circulating the oil in the rod side oil chamber 327B of the cylinder 313 from the outside flow path 313C of the cylinder 313 toward the piston side oil chamber 327A in the extension stroke, the extension side damping valve 361 is provided in an upstream side of the extension side flow path (the extension and compression common flow paths 346A and 346B, and the extension side flow paths 350B and 360A), the extension side check valve 362 is provided in a downstream side thereof, and an intermediate portion of the extension side damping valve 361 and the extension side check valve 362 in the extension side flow path (the extension and compression common flow paths 346A and 346B, and the extension side flow paths 350B and 360A) communicates with the oil reservoir chamber 332 via the extension and compression common flow paths 346A, and 348A to 348C.

Accordingly, the hydraulic shock absorber 300 carries out a damping action as follows.

(Compression Stroke) (Flow Shown by Solid Line Arrows in FIG. 21A)

The pressure of oil in the piston side oil chamber 327A increases and pushes open the compression side damping valve 351 in the compression side flow path 350A of the compression side piston 350 of the damping force generating device 340 so as to generate the compression side damping force. The oil flowing out through the compression side damping valve 351 to the extension and compression common flow path 346A is separated into two flows in the extension and compression common flow path 346A, one flow of the oil flows out to the rod side oil chamber 327B through the compression side check valve 352 in the compression side flow path 360B of the extension side piston 360 through the outside flow path 313C of the cylinder 313, and the other flow of the oil is discharged to the oil reservoir chamber 332. The other flow of the oil discharged to the oil reservoir chamber 332 compensates the amount of oil corresponding to the volumetric capacity of the forward movement of the piston rod 314.

(Extension Stroke) (Flow Shown by Dashed Dotted Line Arrows in FIG. 21B)

The pressure of oil in the rod side oil chamber 327B increases and pushes open the extension side damping valve 361 in the extension side flow path 360A of the extension side piston 360 of the damping force generating device 340 through the outside flow path 313C of the cylinder 313 so as to generate the extension side damping force. The oil flowing out through the extension side damping valve 361 to the extension and compression common flow path 346A conflows with the oil replenished from the oil reservoir chamber 332 and thereafter flows out to the piston side oil chamber 327A through the extension side laminated disc valve 362 in the extension side flow path 350B of the compression side piston 350. The oil replenished from the oil reservoir chamber 332 compensates the amount of oil corresponding to the volumetric capacity of the backward movement of the piston rod 314.

Therefore, in accordance with the present embodiment, the following effects can be obtained.

(a) In the hydraulic shock absorber 300, the damping force generating device 340 is provided between the piston side oil chamber 327A of the cylinder 313, and the rod side oil chamber 327B, the damping force generating device 340 is provided with the compression side flow path (the extension and compression common flow paths 346A and 346B, and the compression side flow paths 350A and 360B) circulating the oil in the piston side oil chamber 327A of the cylinder 313 from the outside flow path 313C of the cylinder 313 toward the rod side oil chamber 327B in the compression stroke, the compression side damping valve 351 is provided in the upstream side of the compression side flow path (the extension and compression common flow paths 346A and 346B, and the compression side flow path 350A and 350B), the compression side laminated disc valve 352 is provided in the downstream side thereof, and the intermediate portion of the compression side damping valve 351 and the compression side laminated disc valve 352 in the compression side flow path (the extension and compression common flow paths 346A and 346B, and the compression side flow paths 350A and 350B) communicates with the oil reservoir chamber 332. Further, the damping force generating device 340 is provided with the extension side flow path (the extension and compression common flow paths 346A and 346B, and the extension side flow paths 350A and 360B) circulating the oil in the rod side oil chamber 327B of the cylinder 313 from the outside flow path 313C of the cylinder 313 toward the piston side oil chamber 327A in the extension stroke, the extension side damping valve 361 is provided in the upstream side of the extension side flow path (the extension and compression common flow paths 346A and 346B, and the extension side flow path 350A and 360B), the extension side check valve 362 is provided in the downstream side thereof, and the intermediate portion of the extension side damping valve 361 and the extension side check valve 362 in the extension side flow path (the extension and compression common flow paths 346A and 346B, and the extension side flow paths 350A and 360B) communicates with the oil reservoir chamber 332.

In the compression stroke, the oil with increased pressure in the piston side oil chamber 327A passes through the compression side damping valve 351 in the upstream side of the compression side flow path (the extension and compression common flow paths 346A and 346B, and the compression side flow paths 350A and 360B) of the damping force generating device 340 so as to generate the compression side damping force. One flow of the oil flowing out through the compression side damping valve 351 flows into the rod side oil chamber 327B through the compression side check valve 352 and the outside flow path 313C of the cylinder 313. Further, another flow of the oil flowing out through the compression side damping valve 351 in an amount corresponding to the volumetric capacity of the forward movement of the piston rod 314 flows into the oil reservoir chamber 332. At this time, the pressure of the rod side oil chamber 327B depends substantially only on the pressure of the air chamber 331 (since the flow path resistance between the compression side check valve 352 in the downstream side of the compression side damping valve 351 and the outside flow path 313C of the cylinder 313 is small), and does not fluctuate depending on the setting of the flow path resistance of the compression side damping valve 351. Accordingly, it is possible to avoid the pause in the damping force when reversing to the extension stroke.

In the extension stroke, the oil with increased pressure in the rod side oil chamber 327B passes through the extension side damping valve 361 in the upstream side of the extension side flow path (the extension and compression common flow paths 346A and 346B, and the extension side flow paths 250A and 260B) of the damping force generating device 340 from the outside flow path 313C of the cylinder 313 so as to generate the extension side damping force. The oil flowing out through the extension side damping valve 361 conflows with the oil in an amount corresponding to the volumetric capacity of the backward movement of the piston rod 314 replenished from the oil reservoir chamber 332, and thereafter flows into the piston side oil chamber 327A through the extension side laminated disc valve 362.

In this case, it is possible to set the pressure in the rod side oil chamber 327B to the large positive pressure so as to improve the damping response when reversing to the extension stroke, by setting the pressure in the air chamber 331 pressurizing the oil reservoir chamber 332 to a high pressure.

(b) The damping force generating device 340 of the above (a) has the valve piece 341 which is fixed to the cylinder 313 provided in the damper case 311, the center plate 345 is provided in the center along the axial direction of the outer periphery of the valve piece 341, the compression side damping valve 351 and the extension side check valve 362 are provided in one side in the axial direction in both sides of the center plate 345 in the outer periphery of the valve piece 341, the extension side damping valve 361 and the compression side check valve 352 are provided in the other side, and a set of the compression side damping valve 351 and the extension side check valve 362 and a set of the extension side damping valve 61 and the compression side check valve 352 are arranged in a line symmetrical manner with respect to the center plate 345. Accordingly, it is possible to set both the flow path of the oil in the above (a) which flows out of the rod side oil chamber 327B and the oil reservoir chamber 332 from the piston side oil chamber 327A through the damping force generating device 340 in the compression stroke, and the flow path of the oil in the above (a) which flows out to the piston side oil chamber 327A from the rod side oil chamber 327B and the oil reservoir chamber 332 through the damping force generating device 340, to a short flow path length and a small flow path resistance, and it is possible to make the flows of the oils smooth.

(c) The damping force generating device 340 in the above (b) is structured such that the valve piece 341 is fixed onto the center axis of the cylinder 313 in one end side within the piston side oil chamber 327A of the cylinder 313, the extension and compression common flow path 346A is provided around the center plate 345, and the extension and compression common flow path 346A communicates with the oil reservoir chamber 332 via the extension and compression common flow path 348A provided in the center plate 345, and the extension and compression common flow path 348B provided in the valve piece 341. Accordingly, it is possible to make the path communicating the extension and compression common flow path 346A of the damping force generating device 340 with the oil reservoir chamber 332 compact, and it is possible to make the flow of the oil in the path smooth.

In this case, the damping force generating device 340 may be structured such that the compression side damping force generating means is added to the compression side check valve 352 provided in the downstream side of the compression side flow path (the extension and compression common flow paths 346A and 346B, and the compression side flow paths 350A and 360B). The compression side damping force generating means can be constructed by using a laminated disc valve as the compression side check valve 352, and/or using a throttle flow path as the compression side flow path 360B provided with the compression side check valve 352.

In accordance with this structure, in the compression stroke, while one flow of the oil flowing out through the compression side damping valve 351 in the upstream side passes through the compression side check valve 352 and the outside flow path 313 of the cylinder 313 so as to flow into the rod side oil chamber 327B, the compression side check valve 352 carries out the compression side damping force generating function as well as the check function. The compression side check valve 352 generates the damping force $\Delta F$ depending on the piston speed, and the pressure Pr of the rod side oil chamber 327B becomes a value obtained by subtracting the value F from the pressure Pa of the air chamber 331 pressurizing the oil reservoir chamber 332, namely, a value controlled depending on the piston speed.

The pressure Pr of the rod side oil chamber 327B being controlled in the compression stroke depending on the piston speed as described above means that it is possible to control a rise characteristic of the damping force when reversing to the extension stroke depending on the piston speed. When the piston speed is high, the value $\Delta F$ becomes large by the throttle of the compression side check valve 352, and the value Pr becomes small. Accordingly, the rise of the damping force when reversing to the extension stroke becomes gentle and the ride quality is improved. When the piston speed is low, the value $\Delta F$ generated by the throttling the compression side check valve 352 becomes small, and the value Pr becomes large. Accordingly, the rise of the damping force when reversing to the extension stroke becomes sharp, and it is possible to suppress the wobbliness of the vehicle body so as to improve the driving stability.

At this time, while the total amount of the compression side damping force becomes the total of the damping force of the compression side damping valve 351 and the damping force of the compression side check valve 352, in the normal setting, the damping force of the compression side damping valve 351 is made larger. The total amount of the compression side damping force largely depends on the damping force of the compression side damping valve 351.

Further, the damping force generating device 340 may be structured such that the extension side damping force generating means is added to the extension side check valve 362 provided in the downstream side of the extension side flow path (the extension and compression common flow paths 346A and 346B, and the extension side flow paths 350B and 360A). The extension side damping force generating means can be constructed by using a laminated disc valve as the extension side check valve 362, and/or using a throttle flow path as the extension side flow path 350B provided with the extension side check valve 362.

In accordance with this structure, in the extension stroke, while one flow of the oil flowing out through the extension side damping valve 361 in the upstream side flows into the piston side oil chamber 327A through the extension side check valve 362 and the outside flow path 313C of the cylinder 313, the extension side check valve 362 carries out the extension side damping force generating function as well as the check function. The extension side check valve 362 generates the damping force $\Delta F$ depending on the piston speed, and the pressure Pp of the piston side oil chamber 327A becomes the value obtained by subtracting the value $\Delta F$ from the pressure Pa of the air chamber 331 pressurizing the oil reservoir chamber 332, namely, the value controlled depending on the piston speed.

The pressure Pp of the piston side oil chamber 327A being controlled depending on the piston speed in the extension stroke as described above means that it is possible to control the rise characteristic of the damping force when reversing to the compression stroke depending on the piston speed. When the piston speed is high, the value ΔF becomes large by the throttle of the extension side check valve 362, and the value Pp becomes small. Accordingly, the rise of the damping force when reversing to the compression stroke becomes gentle so as to improve the ride quality. When the piston speed is low, the value ΔF generated by the throttle of the extension side laminated disc valve 362 becomes small, and the value Pp becomes large. Accordingly, the rise of the damping force when reversing to the compression stroke becomes sharp so as to suppress the wobbliness of the vehicle body and improve the driving stability.

At this time, while the total amount of the extension side damping force becomes the total of the damping force of the extension side damping valve 361, and the damping force of the extension side check valve 362, the damping force of the extension side damping valve 361 is made larger in the normal setting. The total amount of the extension side damping force largely depends on the damping force of the extension side damping valve 361.

Further, the damping force generating device 340 may be structured such that the valve piece 341 is provided with a bypass flow path communicating the piston side oil chamber 327A of the cylinder 313 with the rod side oil chamber 327B and the oil reservoir chamber 332, bypassing the compression side damping valve 351 and the extension side damping valve 361, and the bypass flow path is provided with a damping force adjusting valve which is externally operated. Accordingly, it is possible to adjust the magnitude of the compression side damping force and the extension side damping force by using the damping force generating device 340.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

According to the present invention, a hydraulic shock absorber is structured such that a damping force generating device is provided between a piston side oil chamber and a rod side oil chamber in a cylinder, and in a compression stroke, a compression side flow path for circulating oil in the piston side oil chamber of the cylinder through an outside flow path of the cylinder to the rod side oil chamber is provided in the damping force generating device, a compression side damping valve is provided in the upstream side of the compression side flow path, a compression side check valve is provided in the downstream side thereof, an intermediate portion of the compression side damping valve and the compression side check valve in the compression side flow path communicates with the oil reservoir chamber, while in an extension stroke, an extension side flow path for circulating oil in the rod side oil chamber of the cylinder through the outside flow path of the cylinder toward the piston side oil chamber is provided in the damping force generating device, an extension side damping valve is provided in the upstream side of the extension side flow path, an extension side check valve is provided in the downstream side thereof, and an intermediate portion of the extension side damping valve and the extension side check valve in the extension side flow path communicates with the oil reservoir chamber. Accordingly, it is possible to prevent the pressure of the rod side oil chamber from being changed depending on the setting of the flow path resistance of the compression side damping valve in the compression stroke in which the oil in the piston side oil chamber flows out to the rod side oil chamber and the oil reservoir chamber, and it is possible to avoid the pause in the damping force when reversing to the extension stroke, in the hydraulic shock absorber.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A hydraulic shock absorber comprising:
   a piston rod attached to one of a vehicle body side and an axle side, the piston rod being inserted into an oil chamber of a cylinder which is attached to the other of the vehicle body side and the axle side;
   the oil chamber of the cylinder being comparted into a piston side oil chamber and a rod side oil chamber by a piston provided in a leading end portion of the piston rod; and
   an oil reservoir chamber for compensating a volumetric capacity of the piston rod moving forward and backward with respect to the oil chamber of the cylinder, the oil reservoir chamber being in communication with the oil chamber of the cylinder,
   wherein a damping force generating device is provided between the piston side oil chamber and the rod side oil chamber of the cylinder, including a bypass flow path communicating the piston side chamber of the cylinder directly with the oil reservoir chamber while bypassing the compression side damping valve and a damping force adjusting valve that is externally operated in the bypass flow path, in a valve piece that is fixed to the cylinder;
   wherein a center plate is provided in the center along an axial direction of an outer periphery of the valve piece, and
   wherein the compression side damping valve and the extension side check valve are provided on one side in the axial direction with respect to the center plate in the outer periphery of the valve piece, the extension side damping valve and the compression side check valve are provided on the other side, and a set of the compression side damping valve and the extension side check valve and a set of the extension side damping valve and the compression side check valve are arranged line-symmetric with respect to the center plate;
   wherein in a compression stroke, a compression side flow path for circulating oil in the piston side oil chamber of the cylinder through only an outside flow path of the cylinder toward the rod side oil chamber is provided in the damping force generating device, a compression side damping valve is provided in an upstream side of the compression side flow path, a compression side check valve is provided in a downstream side thereof, and an intermediate portion between the compression side damping valve and the compression side check valve in the compression side flow path communicates directly with the oil reservoir chamber, and wherein in an extension stroke, an extension side flow path for circulating oil in the rod side oil chamber of the cylinder through only the outside flow path of the cylinder toward the piston side oil chamber is provided in the damping force generating device, an extension side damping valve is provided in an upstream side of the extension side flow path, an extension side check valve is provided in a downstream side thereof, and an intermediate portion between the extension side damping valve and the extension side check valve in the extension side flow path communicates directly with the oil reservoir chamber;

wherein the damping force generating device utilizes a compression side laminated disc valve as the compression side check valve provided in a downstream side of the compression side flow path, the compression side laminated disc valve provided with a compression side damping force generating means.

2. The hydraulic shock absorber according to claim 1, wherein the damping force generating device utilizes an extension side laminated disc valve as the extension side check valve, the extension side laminated disc valve provided in a downstream side of the extension side flow path provided with an extension side damping force generating means.

3. The hydraulic shock absorber according to claim 1, wherein the damping force generating device includes an extension side damping force generating means provided by the extension side check valve in the downstream side of the extension side flow path.

* * * * *

UNITED STATES PATENT AND TRADEMARK OFFICE
CERTIFICATE OF CORRECTION

PATENT NO. : 8,857,582 B2  
APPLICATION NO. : 12/814408  
DATED : October 14, 2014  
INVENTOR(S) : Yosuke Murakami Page 1 of 1

It is certified that error appears in the above-identified patent and that said Letters Patent is hereby corrected as shown below:

In the Claims

At column 42, line 40:

the piston side chamber

Should be:

the piston side oil chamber

Signed and Sealed this  
Seventeenth Day of November, 2015

Michelle K. Lee  
*Director of the United States Patent and Trademark Office*